(12) United States Patent
Zhang et al.

(10) Patent No.: US 12,389,388 B2
(45) Date of Patent: Aug. 12, 2025

(54) METHOD FOR SENDING AND RECEIVING CONTROL INFORMATION, APPARATUS, AND SYSTEM

(71) Applicant: Huawei Technologies Co., Ltd., Shenzhen (CN)

(72) Inventors: Yunhao Zhang, Shanghai (CN); Xiuqiang Xu, Shanghai (CN); Yan Chen, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 754 days.

(21) Appl. No.: 17/678,776

(22) Filed: Feb. 23, 2022

(65) Prior Publication Data

US 2022/0183029 A1  Jun. 9, 2022

Related U.S. Application Data

(63) Continuation of application No. PCT/CN2019/102341, filed on Aug. 23, 2019.

(51) Int. Cl.
*H04W 72/20* (2023.01)
*H04L 1/00* (2006.01)
(Continued)

(52) U.S. Cl.
CPC ....... *H04W 72/1263* (2013.01); *H04L 1/0038* (2013.01); *H04L 5/0051* (2013.01);
(Continued)

(58) Field of Classification Search
CPC ............. H04W 72/1263; H04W 72/20; H04W 72/0453; H04W 72/0446; H04L 27/26136;
(Continued)

(56) References Cited

U.S. PATENT DOCUMENTS

2008/0291324 A1* 11/2008 Hong ..................... H04N 5/772
348/484
2018/0176059 A1 6/2018 Medles et al.
(Continued)

FOREIGN PATENT DOCUMENTS

CN 102740372 A 10/2012
CN 108631934 A 10/2018
(Continued)

OTHER PUBLICATIONS

"On PDCCH-based power saving signal/channel," 3GPP TSG RAN WG1 RAN1 Meeting #96bis, R1-1904461, Xi'an, China, pp. 1-7, 3rd Generation Partnership Project, Valbonne, France (Apr. 8-12, 2019).
(Continued)

*Primary Examiner* — Anez C Ebrahim
(74) *Attorney, Agent, or Firm* — Leydig, Voit & Mayer, Ltd.

(57) ABSTRACT

This application provides a method for sending and receiving control information, an apparatus, and a system. A transmit end sends control information on a data channel, so that a receive end does not need to monitor a control channel through blind detection within a period of time that is after the receive end receives the control information. This can reduce power consumption of the receive end, and also reduce detection complexity caused by blind detection. In addition, attribute information of a demodulation reference signal (DMRS), a start position of a time domain resource and/or a frequency domain resource occupied by the data channel, or a parameter in semi-persistent transmission (SPS) information is used to indicate whether the control information is carried on the data channel. In this way, the receive end can correctly receive the control information, and signaling overheads can be effectively reduced.

15 Claims, 6 Drawing Sheets

(51) Int. Cl.
*H04L 5/00* (2006.01)
*H04W 72/0446* (2023.01)
*H04W 72/0453* (2023.01)
*H04W 72/1263* (2023.01)

(52) U.S. Cl.
CPC ... *H04W 72/0446* (2013.01); *H04W 72/0453* (2013.01); *H04W 72/20* (2023.01)

(58) Field of Classification Search
CPC ... H04L 1/0075; H04L 5/0094; H04L 1/0072; H04L 5/0051; H04L 5/0032; H04L 1/0038
See application file for complete search history.

(56) References Cited

U.S. PATENT DOCUMENTS

| | | | |
|---|---|---|---|
| 2018/0279223 A1 | 9/2018 | Kim et al. | |
| 2019/0281418 A1* | 9/2019 | Chen | H04W 4/70 |
| 2021/0006369 A1* | 1/2021 | Bai | H04L 1/1819 |

FOREIGN PATENT DOCUMENTS

| | | |
|---|---|---|
| CN | 108882366 A | 11/2018 |
| CN | 109155931 A | 1/2019 |
| CN | 109963339 A | 7/2019 |
| EP | 3487102 A1 | 5/2019 |
| WO | 2017076601 A1 | 5/2017 |

OTHER PUBLICATIONS

"3rd Generation Partnership Project; Technical Specification Group Radio Access Network; Evolved Universal Terrestrial Radio Access (E-UTRA); Multiplexing and channel coding (Release 13)," 3GPP TS 36.212 V13.9.0, pp. 1-140, 3rd Generation Partnership Project, Valbonne, France (Jun. 2019).

"DL Signals and Channels for NR-unlicensed," 3GPP TSG RAN WG1 Meeting #97, R1-1906783, Reno, NV, USA, Total 6 pages. 3rd Generation Partnership Project, Valbonne, France (May 13-17, 2019).

"3rd Generation Partnership Project; Technical Specification Group Radio Access Network; NR; Multiplexing and channel coding (Release 15)," 3GPP TS 38.212 V15.6.0, pp. 1-101, 3rd Generation Partnership Project, Valbonne, France (Jun. 2019).

* cited by examiner

METHOD FOR SENDING AND RECEIVING CONTROL INFORMATION, APPARATUS, AND SYSTEM

CROSS-REFERENCE TO RELATED APPLICATIONS

This application is a continuation of International Application No. PCT/CN2019/102341, filed on Aug. 23, 2019, the disclosure of which is hereby incorporated by reference in its entirety.

TECHNICAL FIELD

This application relates to the communication field, and more specifically, to a method for sending and receiving control information, an apparatus, and a system in the communication field.

BACKGROUND

A network device sends control information on a control channel, to schedule a data channel. For example, the control channel may be a physical downlink control channel (PDCCH), and the control information may be downlink control information (DCI). The PDCCH has a fixed search space, and UE needs to blindly detect DCI in different formats in the search space.

However, because a terminal device cannot learn of in advance a specific time point at which the network device sends the DCI and a specific resource used by the network device to send the DCI, the terminal device needs to monitor a possible PDCCH on all possible resources at all possible time points to perform blind detection. Consequently, this causes large power consumption of the terminal device in the process.

SUMMARY

This application provides a method for sending and receiving control information, an apparatus, and a system. A transmit end sends control information on a data channel, so that a receive end does not need to monitor a control channel through blind detection within a period of time that is after the receive end receives the control information. This can reduce power consumption of the receive end, and also reduce detection complexity caused by blind detection. In addition, attribute information of a demodulation reference signal (DMRS), a start position of a time domain resource and/or a frequency domain resource occupied by the data channel, or a parameter in semi-persistent transmission (SPS) information is used to indicate whether the control information is carried on the data channel and indicate a related attribute of the control information. In this way, the receive end can correctly receive the control information, and signaling overheads can be effectively reduced.

According to a first aspect, a method for sending and receiving control information is provided. The method includes:
  obtaining a demodulation reference signal DMRS, where attribute information of the DMRS is used to indicate that control information is carried on a data channel; and
  receiving the control information on the data channel.

Therefore, according to the method for sending and receiving control information provided in this application, a transmit end sends the control information on the data channel, so that a receive end does not need to monitor a control channel through blind detection within a period of time that is after the receive end receives the control information. In this way, power consumption of the receive end and detection complexity can be effectively reduced. In addition, the DMRS is sent to the receive end for data demodulation. Therefore, when the attribute information of the DMRS is used to indicate whether the control information is carried on the data channel, before decoding content carried on the current data channel, the receive end can determine, based on the DMRS, that the control information is carried on the current data channel, to correctly receive the control information, so that the signaling overheads can be effectively reduced. In addition, because the control information does not need to be carried on the control channel, this application is well applicable to a transmission scenario in which a data channel is configured through semi-persistent scheduling or higher layer signaling.

Optionally, the attribute information of the DMRS is further used to indicate one or more of the following: a start position or an end position of a first time-frequency resource that carries the control information, a size of the control information, a function of the control information, or an encoding scheme of the control information.

Therefore, according to the method for sending and receiving control information provided in this application, the attribute information of the DMRS is used to indicate a related attribute of the control information, so that the receive end can obtain, based on the DMRS, the related attribute of the control information before decoding the content carried on the current data channel, to correctly receive the control information on the current data channel. In addition, because the DMRS is sent to the receive end for data demodulation, the signaling overheads can be effectively reduced.

Optionally, the control information is carried on the first time-frequency resource, the first time-frequency resource is related to a first position and the size of the control information, and the first position is the start position of the first time-frequency resource or the end position of the first time-frequency resource.

Optionally, the first position corresponds to a second time-frequency resource, the second time-frequency resource is used to carry indication information, and the indication information is used to indicate the size of the control information.

Therefore, according to the method for sending and receiving control information provided in this application, when the size of the control information has a large quantity of values, an implicit indication option may not be sufficient to completely cover all possible values of the size of the control information. Therefore, the size of the control information having a large quantity of values may be indicated by obtaining the size of the control information on the second time-frequency resource. In addition, because the receive end needs to determine, based on the first position, the first time-frequency resource that carries the control information, the first position is associated with the second time-frequency resource. In this way, in a possible implementation, the second time-frequency resource may be set at a position near the first time-frequency resource, so that the first time-frequency resource and the second time-frequency resource are mapped to a same resource block, to facilitate implementation.

Optionally, the attribute information of the DMRS includes one or more of the following: port information of the DMRS, sequence information of the DMRS, or a resource mapping manner of the DMRS.

Optionally, the sequence information of the DMRS includes one or more of the following: a cyclic shift of a sequence, a type of a sequence, or an initialization parameter of a sequence.

Optionally, the resource mapping manner of the DMRS includes one or more of the following: a comb frequency division manner, a time-domain code division manner, or a frequency-domain code division manner.

Optionally, the method further includes:
receiving configuration information, where the configuration information is used to configure the attribute information of the DMRS to indicate that the control information is carried on the data channel.

Optionally, the data channel is a data channel configured through semi-persistent scheduling or higher layer signaling.

According to a second aspect, a method for sending and receiving control information is provided. The method includes:
obtaining a demodulation reference signal DMRS, where attribute information of the DMRS is used to indicate one or more of the following: a start position or an end position of a first time-frequency resource that carries control information, a size of control information, a function of control information, or an encoding scheme of control information; and
receiving the control information on a data channel.

Therefore, according to the method for sending and receiving control information provided in this application, a transmit end sends the control information on the data channel, so that a receive end does not need to monitor a control channel through blind detection within a period of time that is after the receive end receives the control information. In this way, power consumption of the receive end and detection complexity can be effectively reduced. In addition, the DMRS is sent to the receive end for data demodulation. Therefore, when the attribute information of the DMRS is used to indicate a related attribute of the control information carried on the data channel, before decoding content carried on the current data channel, the receive end can determine, based on the DMRS, the related attribute of the control information carried on the current data channel, to correctly receive the control information, so that signaling overheads can be effectively reduced. In addition, because the control information does not need to be carried on the control channel, this application is well applicable to a transmission scenario in which a data channel is configured through semi-persistent scheduling or higher layer signaling.

Optionally, the attribute information of the DMRS includes one or more of the following: port information of the DMRS, sequence information of the DMRS, or a resource mapping manner of the DMRS.

Optionally, the sequence information of the DMRS includes one or more of the following: a cyclic shift of a sequence, a type of a sequence, or an initialization parameter of a sequence.

Optionally, the resource mapping manner of the DMRS includes one or more of the following: a comb frequency division manner, a time-domain code division manner, or a frequency-domain code division manner.

Optionally, the method further includes:
receiving configuration information, where the configuration information is used to configure the attribute information of the DMRS to indicate one or more of the following: the start position or the end position of the first time-frequency resource that carries the control information, the size of the control information, the function of the control information, or the encoding scheme of the control information.

Optionally, the data channel is a data channel configured through semi-persistent scheduling or higher layer signaling.

According to a third aspect, a method for sending and receiving control information is provided. The method includes:
sending a demodulation reference signal DMRS, where attribute information of the DMRS is used to indicate that control information is carried on a data channel; and
sending the control information on the data channel.

Optionally, the attribute information of the DMRS is further used to indicate one or more of the following: a start position or an end position of a first time-frequency resource that carries the control information, a size of the control information, a function of the control information, or an encoding scheme of the control information.

Optionally, the control information is carried on the first time-frequency resource, the first time-frequency resource is related to a first position and the size of the control information, and the first position is the start position of the first time-frequency resource or the end position of the first time-frequency resource.

Optionally, the first position corresponds to a second time-frequency resource, the second time-frequency resource is used to carry indication information, and the indication information is used to indicate the size of the control information.

Optionally, the attribute information of the DMRS includes one or more of the following: port information of the DMRS, sequence information of the DMRS, or a resource mapping manner of the DMRS.

Optionally, the sequence information of the DMRS includes one or more of the following: a cyclic shift of a sequence, a type of a sequence, or an initialization parameter of a sequence.

Optionally, the resource mapping manner of the DMRS includes one or more of the following: a comb frequency division manner, a time-domain code division manner, or a frequency-domain code division manner.

Optionally, the method further includes:
sending configuration information, where the configuration information is used to configure the attribute information of the DMRS to indicate that the control information is carried on the data channel.

Optionally, the data channel is a data channel configured through semi-persistent scheduling or higher layer signaling.

According to a fourth aspect, a method for sending and receiving control information is provided. The method includes:
sending a demodulation reference signal DMRS, where attribute information of the DMRS is used to indicate one or more of the following: a start position or an end position of a first time-frequency resource that carries control information, a size of control information, a function of control information, or an encoding scheme of control information; and sending the control information on a data channel.

Optionally, the attribute information of the DMRS includes one or more of the following: port information of the DMRS, sequence information of the DMRS, or a resource mapping manner of the DMRS.

Optionally, the sequence information of the DMRS includes one or more of the following: a cyclic shift of a sequence, a type of a sequence, or an initialization parameter of a sequence.

Optionally, the resource mapping manner of the DMRS includes one or more of the following: a comb frequency division manner, a time-domain code division manner, or a frequency-domain code division manner.

Optionally, the method further includes:

sending configuration information, where the configuration information is used to configure the attribute information of the DMRS to indicate one or more of the following: the start position or the end position of the first time-frequency resource that carries the control information, the size of the control information, the function of the control information, or the encoding scheme of the control information.

Optionally, the data channel is a data channel configured through semi-persistent scheduling or higher layer signaling.

According to a fifth aspect, an apparatus is provided. The apparatus may implement one or more corresponding functions of the transmit end in the first aspect or the second aspect. The apparatus includes a corresponding unit or component configured to perform the foregoing method. The unit included in the apparatus may be implemented by using software and/or hardware. The apparatus may be, for example, a terminal, a network device (for example, a base station), or a chip, a chip system, or a processor that can support a terminal or a network device in implementing the foregoing functions.

According to a sixth aspect, an apparatus is provided. The apparatus may implement one or more corresponding functions of the receive end in the third aspect or the fourth aspect. The apparatus includes a corresponding unit or component configured to perform the foregoing method. The unit included in the apparatus may be implemented by using software and/or hardware. The apparatus may be, for example, a terminal, a network device (for example, a base station), or a chip, a chip system, or a processor that can support a terminal or a network device in implementing the foregoing functions.

According to a seventh aspect, an apparatus is provided. The apparatus includes a processor. The processor is coupled to a memory, and the memory is configured to store a program. When the program is executed by the processor, the apparatus is enabled to implement the method according to the first aspect or the second aspect.

According to an eighth aspect, an apparatus is provided. The apparatus includes a processor. The processor is coupled to a memory, and the memory is configured to store a program. When the program is executed by the processor, the apparatus is enabled to implement the method according to the third aspect or the fourth aspect.

According to a ninth aspect, a computer program product is provided. The computer program product includes computer program code. When the computer program code is run on a computer, the computer is enabled to perform the methods according to the foregoing aspects.

According to a tenth aspect, a computer-readable medium is provided. The computer-readable medium is configured to store a computer program. The computer program includes instructions used to perform the methods according to the foregoing aspects.

According to an eleventh aspect, a chip is provided. The chip includes a processor, configured to: invoke instructions from a memory and run the instructions stored in the memory, to enable a communication device in which the chip is installed to perform the methods according to the foregoing aspects.

According to a twelfth aspect, another chip is provided. The chip includes an input interface, an output interface, a processor, and a memory. The input interface, the output interface, the processor, and the memory are connected to each other through an internal connection path. The processor is configured to execute code in the memory. When the code is executed, the processor is configured to perform the methods according to the foregoing aspects.

According to a thirteenth aspect, a communication system is provided. The communication system includes the apparatus according to the fifth aspect and the apparatus according to the sixth aspect, or includes the apparatus according to the seventh aspect and the apparatus according to the eighth aspect.

DESCRIPTION OF EMBODIMENTS

The following describes technical solutions of this application with reference to the accompanying drawings.

Figure 1:
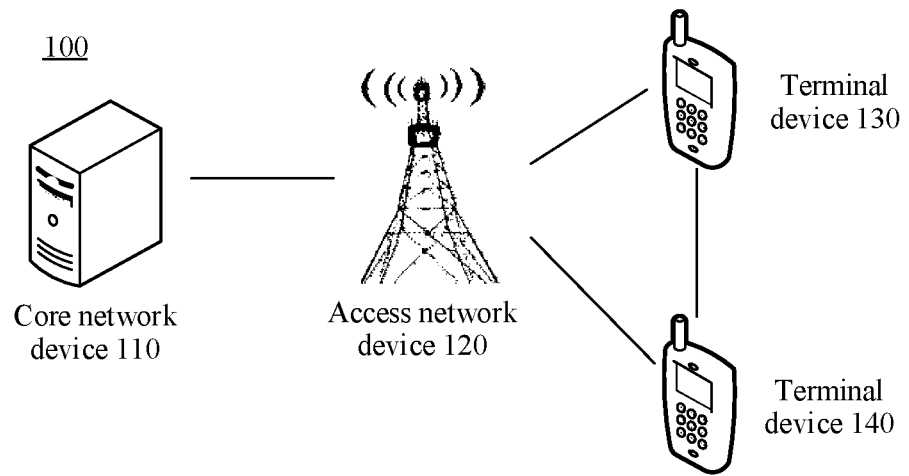
FIG. 1 is a schematic diagram of a possible architecture of a communication system to which an embodiment of this application is applicable according to this application.

FIG. 1 is a schematic diagram of a possible architecture of a communication system to which an embodiment of this application is applicable. As shown in FIG. 1, the communication system includes a core network device 110, an access network device 120, and at least one terminal device (for example, a terminal device 130 and a terminal device 140 in FIG. 1). In this embodiment of this application, the access network device may be used as an example of a network device. The terminal device is connected to the access network device, and the access network device is connected to the core network device in a wireless or wired manner. The core network device and the access network device may be different physical devices that are independent of each other, or functions of the core network device and logical functions of the access network device may be integrated into a same physical device, or some functions of the core network device and some functions of the access network device may be integrated into one physical device. The terminal device may be located at a fixed location, or may be mobile. The terminal device may communicate with the access network device, or two terminal devices may communicate with each other. FIG. 1 is merely a schematic diagram. The communication system may further include another network device, for example, may further include a wireless relay device and a wireless backhaul device, which are not shown in FIG. 1. Quantities of core network devices, access network devices, and terminal devices included in the communication system are not limited in this embodiment of this application.

The technologies described in the embodiments of this application may be applied to various communication systems, for example, a 4G/4.5G/5G communication system, a system converged by a plurality of communication systems, and a future evolved network. The communication systems include, for example, a long term evolution (LTE) system, a new radio (NR) system, a wireless fidelity (Wi-Fi) system, a cellular system related to the 3rd generation partnership project (3GPP), a future evolved communication system, and another communication system of this type.

Figure 2:
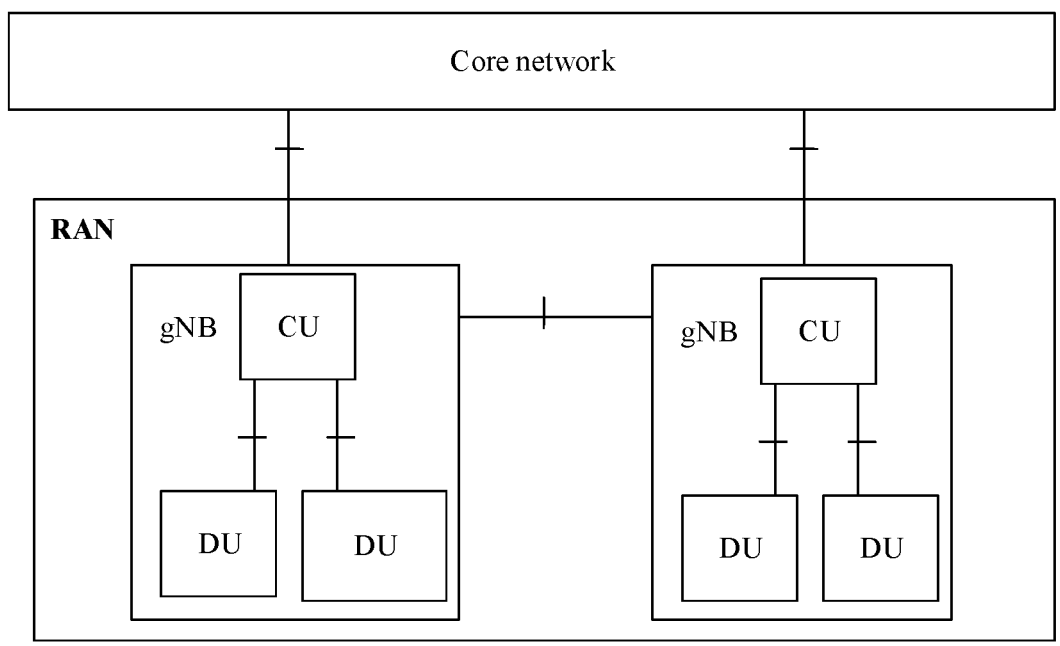
FIG. 2 is a schematic diagram of an example of a possible architecture of a communication system according to this application.

FIG. 2 is a schematic diagram of an example of a possible architecture of a communication system. As shown in FIG. 2, a network device in a radio access network (RAN) is a base station (for example, a gNB) with an architecture in which a centralized unit (CU) and a distributed unit (DU) are separated. The RAN may be connected to a core network (for example, an LTE core network or a 5G core network). The CU and the DU may be understood as division of the base station from a perspective of a logical function. The CU and the DU may be physically separated or deployed together. A plurality of DUs may share one CU. One DU may alternatively be connected to a plurality of CUs (not shown in the figure). The CU and the DU may be connected through an interface, for example, an F1 interface. The CU and the DU may be obtained through division based on protocol layers of a wireless network. For example, functions of a packet data convergence protocol (PDCP) layer and a radio resource control (RRC) layer are deployed on the CU, and functions of a radio link control (RLC) layer, a media access control (MAC) layer, and a physical layer are deployed on the DU. It may be understood that division into processing functions of the CU and the DU based on the protocol layers is merely an example, and the processing functions of the CU and the DU may alternatively be divided in another manner. For example, the CU or the DU may have functions of more protocol layers through division. For example, the CU or the DU may alternatively have some processing functions of protocol layers through division. In a design, some functions of the RLC layer and functions of a protocol layer above the RLC layer are deployed on the CU, and remaining functions of the RLC layer and functions of a protocol layer below the RLC layer are deployed on the DU. In another design, functions of the CU or the DU may alternatively be obtained through division based on a service type or another system requirement. For example, division is performed based on a latency, functions whose processing time needs to satisfy a latency requirement are deployed on the DU, and functions whose processing time does not need to satisfy the latency requirement are deployed on the CU. A network architecture shown in FIG. 2 may be applied to a 5G communication system, and may alternatively share one or more components or resources with an LTE system. In another design, the CU may alternatively have one or more functions of the core network. One or more CUs may be disposed in a centralized manner or a separated manner. For example, the CUs may be disposed on a network side for centralized management. The DU may have a plurality of radio frequency functions, or the radio frequency functions may be disposed remotely.

The functions of the CU may be implemented by one entity, or may be used to further separate a control plane (CP) and a user plane (UP). To be specific, the control plane of the CU (CU-CP) and the user plane of the CU (CU-UP) may be implemented by different function entities, and the CU-CP and the CU-UP may be coupled to the DU to jointly implement a function of the base station.

It may be understood that the embodiments provided in this application are also applicable to an architecture in which the CU and the DU are not separated.

The network device may be any device having a wireless transceiver function. The network device includes but is not limited to: an evolved NodeB (eNB or e-NodeB) in LTE, a base station (gNodeB or gNB) or a transmission reception point (transmission receiving point/transmission reception point, TRP) in NR, a subsequent evolved base station, an access node in a Wi-Fi system, a wireless relay node, a wireless backhaul node, or the like. The base station may be a macro base station, a micro base station, a picocell base station, a small cell, a relay station, a balloon station, or the like. A plurality of base stations may support the foregoing mentioned networks of a same technology, or may support the foregoing mentioned networks of different technologies. The base station may include one or more co-site or non-co-site TRPs. The network device may alternatively be a radio controller, a CU, and/or a DU in a cloud radio access network (CRAN) scenario. The network device may alternatively be a server, a wearable device, a vehicle-mounted device, or the like. The following uses an example in which the network device is a base station for description. The plurality of network devices may be base stations of a same type or base stations of different types. The base station may communicate with a terminal device, or may communicate with a terminal device through a relay station. The terminal device may communicate with a plurality of base stations using different technologies. For example, the terminal device may communicate with a base station supporting an LTE network, or may communicate with a base station supporting a 5G network, or may support communication with a base station in an LTE network and a base station in a 5G network (for example, communication in a dual connection manner).

The terminal device is a device having a wireless transceiver function, and may be deployed on land, including an indoor device, an outdoor device, a handheld device, a wearable device, or a vehicle-mounted device; may be deployed on a water surface (for example, on a ship); or may be deployed in the air (for example, on a plane, a balloon, and a satellite). The terminal device may be a mobile phone, a tablet computer (Pad), a computer having a wireless transceiver function, a virtual reality (VR) terminal device, an augmented reality (AR) terminal device, a wireless terminal in industrial control, a vehicle-mounted terminal device, a wireless terminal in self-driving, a wireless terminal in telemedicine (remote medical), a wireless terminal in a smart grid, a wireless terminal in transportation safety, a wireless terminal in a smart city, a wireless terminal in a smart home, a wearable terminal device, or the like. An application scenario is not limited in this embodiment of this application. The terminal device sometimes may also be referred to as a terminal, user equipment (UE), an access terminal device, a vehicle-mounted terminal, an industrial control terminal, a UE unit, a UE station, a mobile station, a mobile station, a remote station, a remote terminal device, a mobile device, a UE terminal device, a terminal device, a wireless communication device, a UE agent, a UE apparatus, or the like. The terminal device may be fixed or mobile.

The terminal device may alternatively be a terminal device in an internet of things (IoT) system. IoT is an important part in future development of information technologies. A main technical feature of the IoT is to enable an object to connect to a network by using a communication technology, to implement an intelligent network of human-machine interconnection and thing-thing interconnection. The terminal device in the embodiments of this application may alternatively be a terminal device in machine type communication (MTC). The terminal device in this application may alternatively be a vehicle-mounted module, a vehicle-mounted module, a vehicle-mounted component, a vehicle-mounted chip, or a vehicle-mounted unit that is built in a vehicle as one or more components or units. The vehicle uses the vehicle-mounted module, the vehicle-mounted module, the vehicle-mounted component, the vehicle-mounted chip, or the vehicle-mounted unit that is built in the vehicle, to implement a method in this application. Therefore, the embodiments of this application may be applied to the internet of vehicles, for example, vehicle to everything (V2X), long term evolution-vehicle (LTE-V), or vehicle-to-vehicle (V2V).

In a manner in which the network device sends control information, for example, DCI, on a control channel, for example, a PDCCH, because a terminal device needs to perform blind detection on a possible PDCCH on all possible resources at all possible time points. In this process, power consumption overheads of the terminal device are large.

Based on this, this application provides a method for sending and receiving control information. A transmit end (for example, a network device) sends control information on a data channel (for example, a PDSCH), so that a receive end (for example, a terminal device) does not need to monitor a control channel through blind detection within a period of time that is after the receive end receives the control information. This can reduce power consumption of the receive end, and also reduce detection complexity caused by blind detection.

The embodiments of this application may be applied to various transmission scenarios. For example, the transmission scenario in the embodiments of this application may be any one of the following transmission scenarios: semi-persistent scheduling, grant-free scheduling, dynamic scheduling, scheduling-free, dynamic scheduling-free, dynamic grant-free transmission, higher layer configuration transmission, sidelink semi-persistent scheduling, sidelink grant-free scheduling, or the like. In other words, the data channel in this application may be configured in any one of the foregoing transmission scenarios.

The semi-persistent scheduling means that the network device configures a downlink transmission parameter for the terminal device by using higher layer signaling, so that the terminal device periodically receives data from the network device based on higher layer configuration information after the semi-persistent scheduling is activated. The grant-free scheduling means that the network device configures an uplink transmission parameter for the terminal device by using higher layer signaling, so that the terminal device periodically sends data to the network device based on higher layer configuration information after the grant-free scheduling is activated. The dynamic scheduling means that the network device schedules, by using downlink control information DCI, the terminal device to send uplink data or receive downlink data. A transmission scenario of sidelink semi-persistent scheduling, a transmission scenario of scheduling-free, a transmission scenario of dynamic scheduling-free, a transmission scenario of dynamic grant-free transmission, or a transmission scenario of higher layer configuration may be a scenario similar to downlink semi-persistent scheduling, or may be a scenario similar to uplink grant-free transmission. The sidelink semi-persistent scheduling or the grant-free scheduling means that a sidelink transmission parameter is configured for the terminal device by using higher layer signaling, so that the terminal device periodically sends data to one or more other terminal devices or periodically receives data from one or more other terminal devices based on a configuration.

It may be understood that a sidelink (sidelink) in this application may also be sometimes referred to as a sidelink, a sidelink, a sidelink, a device-to-device (device-to-device, D2D) link, a V2X link, a V2V link, or the like.

The following describes in detail a method for sending and receiving control information in this application with reference to FIG. 3 to FIG. 9. All methods in the embodiments of this application are applicable to uplink transmission and downlink transmission, communication between network devices such as a terminal device and a base station, and D2D communication between terminal devices. For ease of description, a transmit end and a receive end are uniformly used as execution bodies in the embodiments of this application. In communication between a terminal device and a network device, the transmit end may be the network device, or an apparatus that can perform the embodiments of this application, for example, a chip or a processor configured in the network device, and correspondingly the receive end is the terminal device, or an apparatus that can perform the embodiments of this application, for example, a chip or a processor configured in the terminal device; or the transmit end may be the terminal device, or an apparatus that can perform the embodiments of this application, for example, a chip or a processor configured in the terminal device, and correspondingly the receive end is the network device, or an apparatus that can perform the embodiments of this application, for example, a chip or a processor configured in the network device. In D2D communication between terminal devices, the transmit end may be one of the terminal devices, or an apparatus that can perform the embodiments of this application, for example, a chip or a processor configured in the terminal device, and correspondingly the receive end may be the other terminal device, or an apparatus that can perform the embodiments of this application, for example, a chip or a processor configured in the terminal device.

Figure 3:
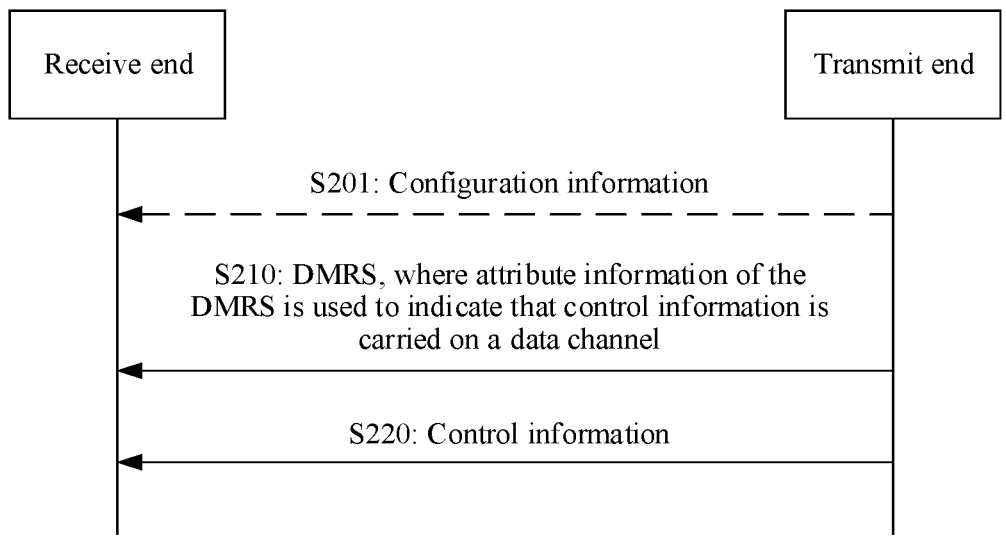
FIG. 3 is a schematic interaction diagram of a method for sending and receiving control information according to this application.

FIG. 3 is a schematic interaction diagram of a method 200 for sending and receiving control information according to this application.

S210: A transmit end sends a demodulation reference signal ( ), where attribute information of the DMRS is used to indicate that control information is carried on a data channel.

Correspondingly, a receive end receives and obtains the DMRS.

The DMRS is a reference signal used to demodulate data information and/or control information. In S210, the data channel that carries the control information and that is indicated by the attribute information of the DMRS may be the same as or different from a data channel that corresponds to content demodulated based on the DMRS. For example, the data channel that corresponds to the content demodulated based on the DMRS may be one or more data channels previous to the data channel indicated by the attribute information of the DMRS. This is not limited in this application.

For example, the data channel that carries the control information is denoted as a data channel #1, a DMRS used to demodulate content carried on the data channel #1 is denoted as a DMRS #1, a data channel previous to the data channel #1 is denoted as a data channel #2, and a DMRS used to demodulate content carried on the data channel #2 is denoted as a DMRS #2. In a possible implementation, the DMRS is the DMRS #2 and is used to indicate that the control information is carried on the data channel #1. In this way, the receive end may determine that the control information is received on the data channel #1 next to the data channel #2. In another possible implementation, the DMRS is the DMRS #1 and is used to indicate that the control information is carried on the data channel #1. In this way, the receive end may determine that the control information is received on the current data channel #1.

For example, the data channel may be a data channel used for communication between a terminal device and a network device, or may be a data channel used for sidelink (SL) communication between terminal devices. Different types of data channels may carry different types of control information, or may carry a same type of control information. This is not limited in this application. If the data channel is the data channel used for communication between a terminal device and a network device, the data channel may be a data channel used for downlink transmission. For example, the data channel may be a physical downlink shared channel (PDSCH), and corresponding control information carried on the data channel is downlink control information (DCI). Alternatively, the data channel may be a data channel used for uplink transmission. For example, the data channel may be a physical uplink shared channel (PUSCH), and corresponding control information carried on the data channel is uplink control information (UCI). Alternatively, the data channel may be the data channel used for SL communication between terminal devices. The data channel may be a physical sidelink shared channel (PSSCH), and corresponding control information carried on the data channel is sidelink control information (sidelink control information, SCI).

In this application, the control information may be control information having various functions.

For example, if the control information is the DCI, a function of the DCI may be one or more of the following: scheduling of PUSCH transmission, scheduling of PDSCH transmission, activation of semi-persistent scheduling of PUSCH transmission, activation of semi-persistent scheduling of PDSCH transmission, deactivation of semi-persistent scheduling of PUSCH transmission, deactivation of semi-persistent scheduling of PDSCH transmission, activation of type 2 PUSCH transmission with configured grant (type 2 PUSCH transmission with configured grant), deactivation of type 2 PUSCH transmission with configured grant, scheduling of PSSCH transmission, scheduling of physical sidelink discovery channel (PSDCH) transmission, activation of semi-persistent scheduling of PSSCH transmission, power control, slot format indication, or hybrid automatic repeat request (HARQ) feedback.

For example, if the control information is the SCI, a function of the SCI may be one or more of the following: scheduling of PUSCH transmission, scheduling of PDSCH transmission, activation of semi-persistent scheduling of PUSCH transmission, activation of semi-persistent scheduling of PDSCH transmission, deactivation of semi-persistent scheduling of PUSCH transmission, deactivation of semi-persistent scheduling of PDSCH transmission, activation of type 2 (type 2) PUSCH transmission with configured grant, deactivation of type 2 (type 2) PUSCH transmission with configured grant, scheduling of PSSCH transmission, scheduling of PSDCH transmission, activation of semi-persistent scheduling of PSSCH transmission, power control, slot format indication, or HARQ feedback.

For example, if the control information is the UCI, a function of the UCI may be one or more of the following: channel state information (CSI) feedback, HARQ feedback, or scheduling request (SR). In this embodiment of this application, the attribute information of the DMRS is used to indicate whether the control information is carried on the data channel, and the attribute information of the DMRS is used to indicate an attribute related to the DMRS.

Optionally, the attribute information of the DMRS includes one or more of the following: port information of the DMRS, sequence information of the DMRS, or a resource mapping manner of the DMRS.

The port information of the DMRS indicates a port corresponding to the DMRS. For example, the port information may be a number or an index of the port.

The sequence information of the DMRS includes one or more of the following: a cyclic shift of a sequence, a type of a sequence, or an initialization parameter of a sequence. The sequence information may also be understood as a parameter used when the DMRS is generated.

The resource mapping manner of the DMRS includes one or more of the following: a comb frequency division manner, a time-domain code division manner, or a frequency-domain code division manner.

It should be understood that a DMRS has a corresponding attribute, and attribute information of the DMRS may be predefined or configured to indicate whether the control information is carried on the data channel. It should be noted that "predefined" in this application may be understood as predefined by a system or in a protocol.

Optionally, before S210, in S201, the transmit end sends configuration information to the receive end, where the configuration information is used to configure the attribute information of the DMRS to indicate that the control information is carried on the data channel. Correspondingly, the receive end receives the configuration information.

For example, the configuration information may be used to configure at least two types of DMRSs. Attribute information of type 1 DMRSs may be configured to indicate that the control information is carried on the data channel, and attribute information of type 2 DMRSs may be configured to indicate that the control information is not carried on the data channel. That is, the configuration information may be used to configure the attribute information of the DMRS to indicate whether the control information is carried on the data channel. The DMRS in S210 belongs to the type 1 DMRSs. In this way, in S210, the receive end obtains the DMRS, and determines, by using the attribute information of the DMRS, that the control information is carried on the data channel.

It is assumed that the configuration information may be used to configure three DMRSs, namely, a DMRS #1, a DMRS #2, and a DMRS #3. The type 1 DMRSs include the DMRS #1 and the DMRS #2, to indicate that the control information is carried on the data channel, and the type 2 DMRSs include the DMRS #3, to indicate that the control information is not carried on the data channel. The DMRS in S210 may be the DMRS #1 or the DMRS #2.

For example, the transmit end may send the configuration information by using one or more of the following: RRC (radio resource control) signaling, media access control (MAC) control unit (CE), or DCI.

It should be understood that a manner in which the transmit end configures, by using the configuration information, the attribute information of the DMRS to indicate whether the control information is carried on the data channel is merely an example for description, and shall not constitute a limitation on this application. For example, in this application, the type 1 DMRSs and the type 2 DMRSs may alternatively be predefined. S210: The receive end obtains the DMRS, and may determine, by using the attribute information of the DMRS and based on a predefined type of a DMRS, that the DMRS belongs to the type 1 DMRSs. In this way, the receive end may determine that the control information is carried on the data channel.

The following separately uses the port information of the DMRS, the sequence information of the DMRS, or the resource mapping manner of the DMRS as an example. The foregoing three DMRSs are still used as an example to describe a manner in which the attribute information of the type 1 DMRSs and the attribute information of the type 2 DMRSs indicate whether the control information is carried on the data channel.

For example, a port number of the DMRS #1 is a port 1, a port number of the DMRS #2 is a port 2, and a port number of the DMRS #3 is a port 3. The port 1 and the port 2 are used to indicate that the control information is carried on the data channel, and the port 3 is used to indicate that the control information is not carried on the data channel.

For example, a sequence of the DMRS #1 is a sequence #1, a sequence of the DMRS #2 is a sequence #2, and a sequence of the DMRS #3 is a sequence #3. The sequence #1 and the sequence #2 are used to indicate that the control information is carried on the data channel, and the sequence #3 is used to indicate that the control information is not carried on the data channel.

For example, a resource mapping manner of the DMRS #1 is a resource mapping manner #1, a resource mapping manner of the DMRS #2 is a resource mapping manner #2, and a resource mapping manner of the DMRS #3 is a resource mapping manner #3. The resource mapping manner #1 and the resource mapping manner #2 are used to indicate that the control information is carried on the data channel, and the resource mapping manner #3 is used to indicate that the control information is not carried on the data channel. The resource mapping manner #1 or the resource mapping manner #2 may be one or more of the comb frequency division manner, the time-domain code division manner, or the frequency-domain code division manner, and the resource mapping manner #3 may also be one or more of the comb frequency division manner, the time-domain code division manner, or the frequency-domain code division manner. For example, the comb frequency division manner and/or the time-domain code division manner may be used as resource mapping manners of the type 1 DMRSs, and the frequency-domain code division manner may be used as a resource mapping manner of the type 2 DMRSs.

The three items in the attribute information of the DMRS may be used separately to indicate whether the control information is carried on the data channel, or may be used in combination to indicate whether the control information is carried on the data channel. This is not limited in this application.

It is assumed that the data channel indicated by the attribute information of the DMRS is the same as the data channel that corresponds to the content demodulated based on the DMRS. A function of the attribute information of the DMRS is described with reference to FIG. 4 by using the DMRS #1, the DMRS #3, and that the control information is the DCI and the function of the DCI is for PDSCH transmission as an example.

Figure 4:
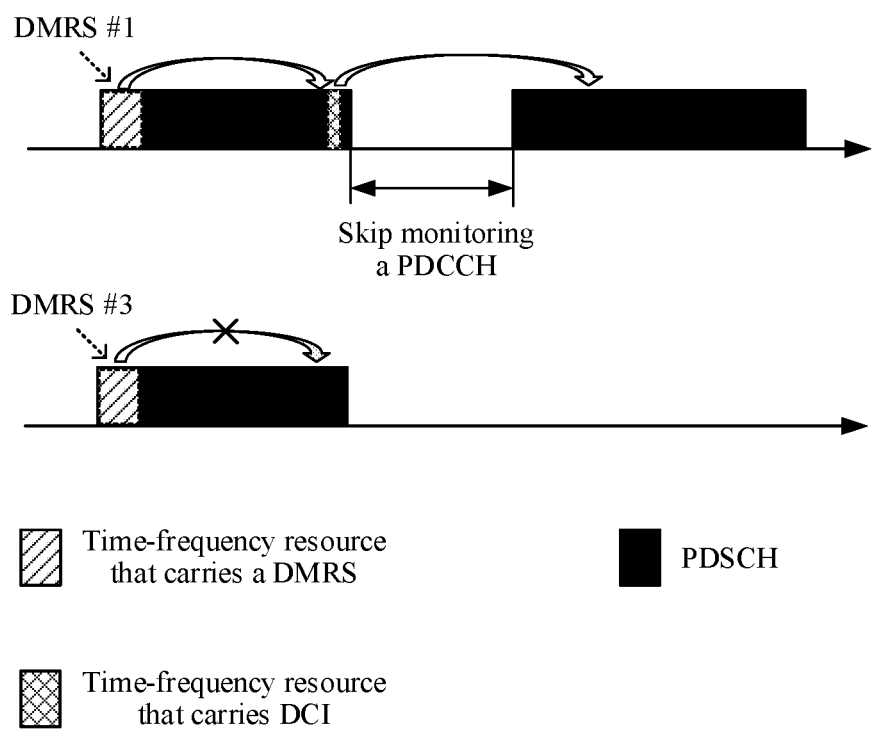
FIG. 4 is a schematic diagram of a data channel, a DMRS, and a time-frequency resource that carries control information according to this application.
Figure 5:
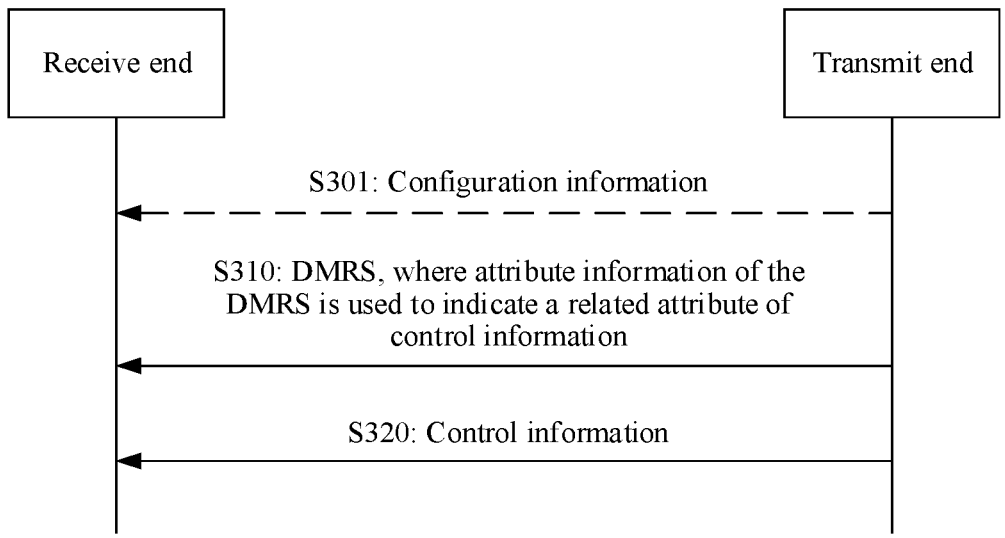
FIG. 5 is another schematic interaction diagram of a method for sending and receiving control information according to this application.

In the first diagram in FIG. 4, the receive end obtains a DMRS #1 on a current PDSCH, where attribute information of DMRS #1 indicates that DCI is carried on the current PDSCH. The receive end determines, by using the attribute information of the DMRS #1, that the DCI is carried on the current PDSCH, and obtains the DCI on the current PDSCH. In addition, the receive end does not need to monitor a PDCCH or perform blind detection within a period of time between the current PDSCH and a PDSCH that is scheduled by using the DCI. In this way, power consumption of the receive end and detection complexity can be effectively reduced.

In the second diagram in FIG. 4, the receive end obtains a DMRS #3 on a current PDSCH, where attribute information of the DMRS #3 indicates that DCI is not carried on the current PDSCH. The receive end determines, by using the attribute information of the DMRS #3, that the DCI is not carried on the current PDSCH, and does not obtain the DCI on the PDSCH.

S220: The transmit end sends the control information on the data channel. Correspondingly, the receive end receives the control information on the data channel.

Optionally, the transmit end may receive the control information on a first time-frequency resource on the data channel. A specific position of the first time-frequency resource on the data channel may be predefined, may be notified by the transmit end to the receive end, or may be obtained by the receive end by using other content. This is not limited in this application.

The following describes a manner of determining the first time-frequency resource.

Optionally, the control information is carried on the first time-frequency resource, the first time-frequency resource is related to a first position and a size of the control information, and the first position is a start position of the first time-frequency resource or an end position of the first time-frequency resource. In addition, the method further includes:

The receive end determines the first time-frequency resource based on the first position and the size of the control information.

The size of the control information indicates a quantity of bits included in the control information. A size of the first time-frequency resource may be determined based on the size of the control information. The size of the first time-frequency resource may be represented by using a quantity N of resource units occupied by the first time-frequency resource. The resource unit may be understood as a measurement unit of a resource in time domain, frequency domain, or time-frequency domain. For example, the resource unit may be a resource element (RE) or a resource block (RB).

For example, the transmit end may obtain, based on the size of the control information and a modulation order that is used for the control information on the data channel, the quantity N of resource units occupied by the first time-frequency resource. In this way, the specific position of the first time-frequency resource may be determined based on the first position and the quantity of the N resource units, where the modulation order used for the control information on the data channel may be the same as or different from a modulation order used for data information on the data channel. This is not limited herein. If the first position is the start position of the first time-frequency resource, N resource units are read backward from the first position, to determine the first time-frequency resource; or if the first position is the end position of the first time-frequency resource, N resource units are read forward from the first position, to determine the first time-frequency resource.

The first position may be predefined, or may be notified by the transmit end to the receive end. This is not limited herein.

The size of the control information may be predefined, or may be determined in another manner. The following describes examples of two manners of determining the size of the control information other than the predefined manner.

Manner 1

Optionally, the first position corresponds to a second time-frequency resource, the second time-frequency resource is used to carry indication information, and the indication information is used to indicate the size of the control information.

When the size of the control information has a large quantity of values, an implicit indication option may not be sufficient to completely cover all possible values of the size of the control information. Therefore, the size of the control information having a large quantity of values may be indicated by obtaining the size of the control information on the second time-frequency resource. In addition, because the receive end needs to determine, based on the first position, the first time-frequency resource that carries the control information, the first position is associated with the second time-frequency resource. In this way, in a possible implementation, the second time-frequency resource may be set at a position near the first time-frequency resource, so that the first time-frequency resource and the second time-frequency resource are mapped to a same resource block, to facilitate implementation.

For example, the receive end determines the second time-frequency resource based on the first position and a correspondence between the first position and the second time-frequency resource, and receives the indication information on the second time-frequency resource, to obtain the size of the control information.

For example, the correspondence between the first position and the second time-frequency resource may be notified by the transmit end to the receive end, or may be predefined. This is not limited herein.

For example, the correspondence between the first position and the second time-frequency resource may be: The second time-frequency resource may be $M_1$ resource units before the first position, where the $M_1$ resource units before the first position may be adjacent to the first position, or may be separated from the first position by one or more resource units. It should be noted that, if the first position is the end position of the first time-frequency resource, the $M_1$ resource units before the first position are $M_1$ resource units before the first time-frequency resource. $M_1$ is an integer greater than or equal to 1.

Optionally, the $M_1$ resource units may be a resource on the data channel that carries the control information. In other words, the second time-frequency resource and the first time-frequency resource may be included in a same data channel.

For example, the correspondence between the first position and the second time-frequency resource may alternatively be: The second time-frequency resource may be $M_2$ resource units after the first position, where the $M_2$ resource units after the first position may be adjacent to the first position, or may be separated from the first position by one or more resource units. It should be noted that, if the first position is the start position of the first time-frequency resource, the $M_2$ resource units after the first position are $M_2$ resource units after the first time-frequency resource. $M_2$ is an integer greater than or equal to 1.

Optionally, the $M_2$ resource units may be a resource on the data channel that carries the control information. In other words, the second time-frequency resource and the first time-frequency resource may be included in a same data channel.

Manner 2

Optionally, the attribute information of the DMRS is further used to indicate the size of the control information.

In other words, the attribute information of the DMRS sent to the receive end may be used to implicitly indicate the size of the control information. In this way, signaling overheads can be reduced.

In the two types of DMRSs that are configured by using the configuration information or predefined, the type 1 DMRSs are not only used to indicate that the control information is carried on the data channel, but also used to indicate sizes of the control information. For example, to distinguish between sizes of the control information that are indicated by attribute information of different DMRSs, the type 1 DMRSs may be divided into a plurality of subsets. Each subset includes one or more DMRSs. Attribute information of DMRSs in any two subsets indicates different sizes of the control information, and attribute information of DMRSs in a same subset indicates a same size of the control information.

The foregoing uses the foregoing manner 1 and manner 2 as examples to describe the manner of determining the size of the control information. It should be understood that the foregoing manners are merely examples for description, and shall not constitute any limitation on this application.

In this application, the attribute information of the DMRS may be used to indicate the size of the control information. Optionally, the attribute information of the DMRS may further be used to indicate the start position or the end position of the first time-frequency resource that carries the control information, a function of the control information, and/or an encoding scheme of the control information.

The start position or the end position of the first time-frequency resource that carries the control information is the first position, and may be used to determine the first time-frequency resource. For example, the time-frequency resource may be determined in the foregoing manner based on the size of the control information and the start position or the end position.

For the function of the control information, refer to the foregoing related descriptions. Details are not described herein again.

The encoding scheme of the control information may be the same as or different from an encoding scheme of the data information carried on the data channel.

In a possible implementation, the control information and the data may be jointly encoded in one transport block (TB). In this case, a same encoding scheme is used for the control information and the data, to ensure accuracy of decoding the control information by the receive end.

In another possible implementation, the control information and the data are independently encoded. Different encoding schemes are used for the control information and the data. The control information may be added at an agreed position such as a head, a tail, or a middle of the data. The receive end decodes the data and the control information in different manners.

In conclusion, the attribute information of the DMRS may be used to indicate a related attribute of the control information. The related attribute of the control information includes one or more of the following: the start position or the end position of the first time-frequency resource that carries the control information, the size of the control information, the function of the control information, or the encoding scheme of the control information. One or more items about the control information may be understood as content of one or more attributes of the control information.

As described above, to distinguish between content, of the control information, indicated by attribute information of different DMRSs, the type 1 DMRSs may be divided into a plurality of subsets. Each subset includes one or more DMRSs. Attribute information of DMRSs in two subsets may indicate a same attribute or different attributes of the control information. When the attribute information of the DMRSs in the two subsets indicates the same attribute of the control information, specific content of the same attribute is different.

For example, attribute information of one or more DMRSs of a subset #1 indicates a size of the control information and a function of the control information, and attribute information of one or more DMRSs of a subset #2 indicates a size of the control information and an encoding scheme. The size, of the control information, indicated by the attribute information of the DMRSs of the subset #1 may be the same as or different from the size, of the control information, indicated by the attribute information of the DMRSs of the subset #2.

For example, the attribute information of the DMRSs of the subset #1 and the attribute information of the DMRSs of the subset #2 both indicate a same attribute of the control information, that is, both indicate a size of the control information, a function of the control information, or an encoding scheme of the control information. However, specific content of the same attribute, of the control information, indicated by the attribute information of the DMRSs of the subset #1 and the attribute information of the DMRSs of the subset #2 is different. A size of the control information is used as an example. The size, of the control information, indicated by the attribute information of the DMRSs of the subset #1 is 4, and the size, of the control information, indicated by the attribute information of the DMRSs of the subset #2 is 5.

In this way, the attribute information of the DMRS is used to indicate the related attribute of the control information, so that the receive end can obtain, based on the DMRS, the related attribute of the control information before decoding content carried on the current data channel, to correctly receive the control information on the current data channel.

In addition, because the DMRS is sent to the receive end for data demodulation, the signaling overheads can be effectively reduced.

Therefore, according to the method for sending and receiving control information provided in this application, the transmit end sends the control information on the data channel, so that the receive end does not need to monitor a control channel through blind detection within a period of time that is after the receive end receives the control information. In this way, the power consumption of the receive end and the detection complexity can be effectively reduced. In addition, the DMRS is sent to the receive end for data demodulation. Therefore, when the attribute information of the DMRS is used to indicate whether the control information is carried on the data channel, before decoding the content carried on the current data channel, the receive end can determine, based on the DMRS, that the control information is carried on the current data channel, to correctly receive the control information, so that the signaling overheads can be effectively reduced. In addition, because the control information does not need to be carried on the control channel, this application is well applicable to a transmission scenario in which a data channel is configured through semi-persistent scheduling or higher layer signaling.

This application further provides another method 300 for sending and receiving control information. In the method, attribute information of a DMRS is used to indicate a related attribute of control information. A receive end may determine, depending on whether the attribute information of the DMRS indicates the related attribute of the control information, whether the control information is carried on a data channel, and receive the control information based on the attribute information of the DMRS. The following describes the method 300 with reference to FIG. 5 and related descriptions of the method 200.

S310: A transmit end sends the DMRS, where the attribute information of the DMRS is used to indicate the related attribute of the control information. The related attribute of the control information includes one or more of the following: a start position or an end position of a first time-frequency resource that carries the control information, a size of the control information, a function of the control information, or an encoding scheme of the control information.

Correspondingly, the receive end receives the DMRS and determines the related attribute of the control information.

In this embodiment, that the attribute information of the DMRS is used to indicate the related attribute of the control information means that the control information is carried on the data channel. Therefore, the attribute information of the DMRS may not only be used to indicate the related attribute of the control information, but also implicitly indicate that the control information is carried on the data channel. By using the attribute information of the DMRS, the receive end may not only know that the control information is carried on the data channel, but also know the related attribute of the control information, to receive the control information on the data channel.

It should be understood that a DMRS has a corresponding attribute, and attribute information of the DMRS may be predefined or configured to indicate the related attribute of the control information.

Optionally, before S310, in S301, the transmit end sends configuration information to the receive end, where the configuration information is used to configure the attribute information of the DMRS to indicate one or more of the following: the start position or the end position of the first time-frequency resource that carries the control information, the size of the control information, the function of the control information, or the encoding scheme of the control information. Correspondingly, the receive end receives the configuration information.

For example, the configuration information may be used to configure a plurality of DMRSs. The plurality of DMRSs may be classified into two types. DMRSs of each type include one or more DMRSs. Attribute information of type 1 DMRSs may be configured to indicate related attributes of the control information. The type 1 DMRSs may be divided into a plurality of subsets. Each subset includes one or more DMRSs. Attribute information of DMRSs in two subsets may indicate a same attribute or different attributes of the control information. When the attribute information of the DMRSs in the two subsets indicates the same attribute of the control information, specific content of the same attribute is different. For specific descriptions, refer to related descriptions of the method 200. Details are not described herein again. The DMRS in S310 belongs to the type 1 DMRSs. Attribute information of type 2 DMRSs may be configured to not indicate related attributes of the control information, or may be configured to indicate that attribute information of the type 2 DMRSs is irrelevant to the control information. That is, the configuration information may be used to configure whether the attribute information of the DMRS is used to indicate the related attribute of the control information. In this way, in S310, the receive end obtains the DMRS, and may determine the related attribute of the control information by using the attribute information of the DMRS.

Optionally, the attribute information of the DMRS includes one or more of the following: port information of the DMRS, sequence information of the DMRS, or a resource mapping manner of the DMRS.

Optionally, the sequence information of the DMRS includes one or more of the following: a cyclic shift of a sequence, a type of a sequence, or an initialization parameter of a sequence.

Optionally, the resource mapping manner of the DMRS includes one or more of the following: a comb frequency division manner, a time-domain code division manner, or a frequency-domain code division manner.

For specific descriptions of the attribute information of the DMRS, refer to related descriptions of the method 200. Details are not described again.

S320: The transmit end sends the control information on the data channel. Correspondingly, the receive end may receive the control information on the data channel based on the related attribute of the control information.

For specific descriptions of this step, refer to related descriptions of the method 200. Details are not described herein again.

In this way, the attribute information of the DMRS is used to indicate the related attribute of the control information, so that the receive end can obtain, based on the DMRS, the related attribute of the control information before decoding content carried on the current data channel, to correctly receive the control information on the current data channel. In addition, because the DMRS is sent to the receive end for data demodulation, signaling overheads can be effectively reduced.

Therefore, according to the method for sending and receiving control information provided in this application, the transmit end sends the control information on the data channel, so that the receive end does not need to monitor a control channel through blind detection within a period of time that is after the receive end receives the control information. In this way, power consumption of the receive end and detection complexity can be effectively reduced. In addition, the DMRS is sent to the receive end for data demodulation. Therefore, when the attribute information of the DMRS is used to indicate the related attribute of the control information carried on the data channel, before decoding the content carried on the current data channel, the receive end can determine, based on the DMRS, the related attribute of the control information carried on the current data channel, to correctly receive the control information, so that the signaling overheads can be effectively reduced. In addition, because the control information does not need to be carried on the control channel, this application is well applicable to a transmission scenario in which a data channel is configured through semi-persistent scheduling or higher layer signaling.

This application further provides another method 400 for sending and receiving control information. In the method, a start position of a time domain resource and/or a frequency domain resource occupied by a data channel may be used to indicate whether control information is carried on the data channel. In this way, power consumption of a receive end and detection complexity can be reduced. In addition, the start position is sent to the receive end to receive content carried on the data channel. Therefore, when the start position is used to indicate whether the control information is carried on the data channel, before decoding the content carried on the current data channel, the receive end can determine, by using a DMRS, that the control information is carried on the current data channel, to correctly receive the control information, so that signaling overheads can be effectively reduced.

Figure 6:
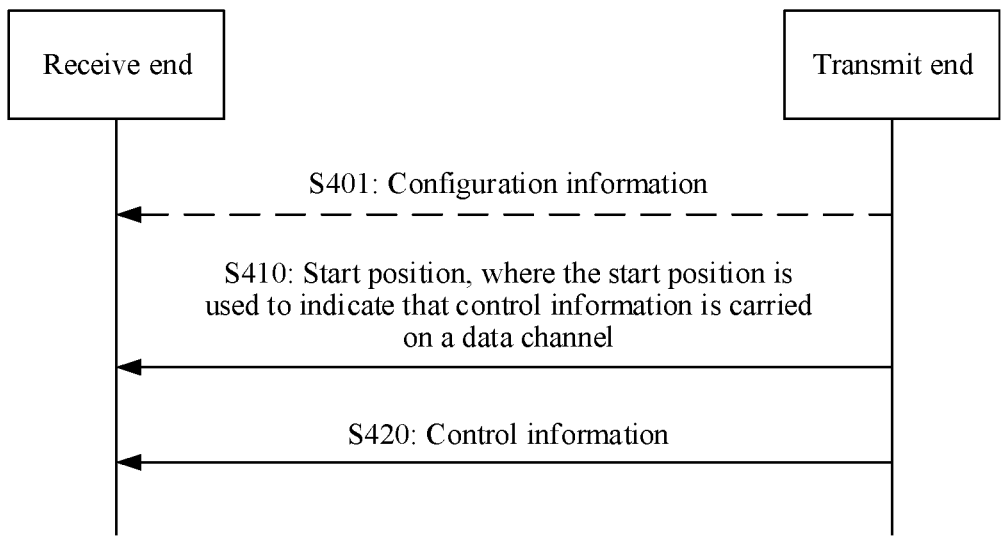
FIG. 6 is another schematic interaction diagram of a method for sending and receiving control information according to this application.
Figure 7:
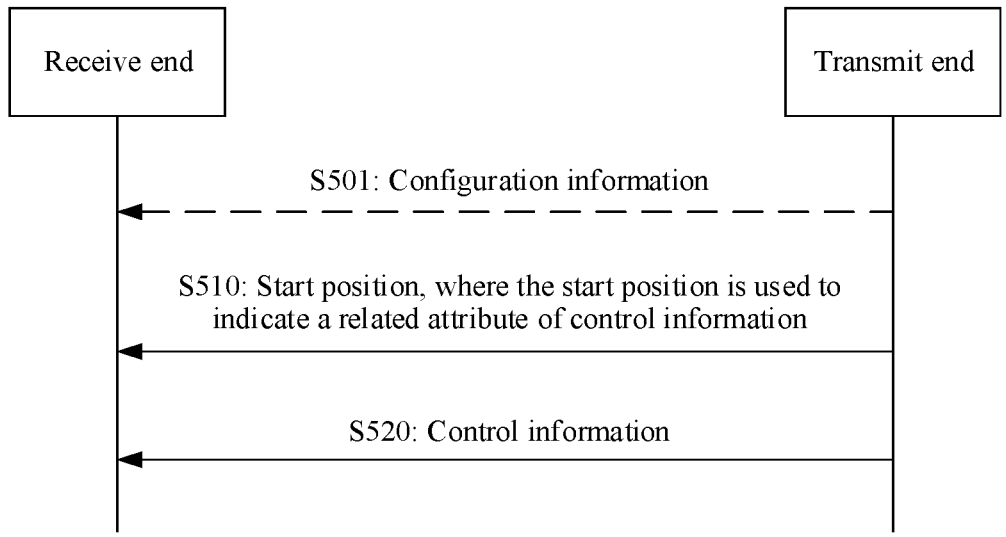
FIG. 7 is another schematic interaction diagram of a method for sending and receiving control information according to this application.
Figure 8:
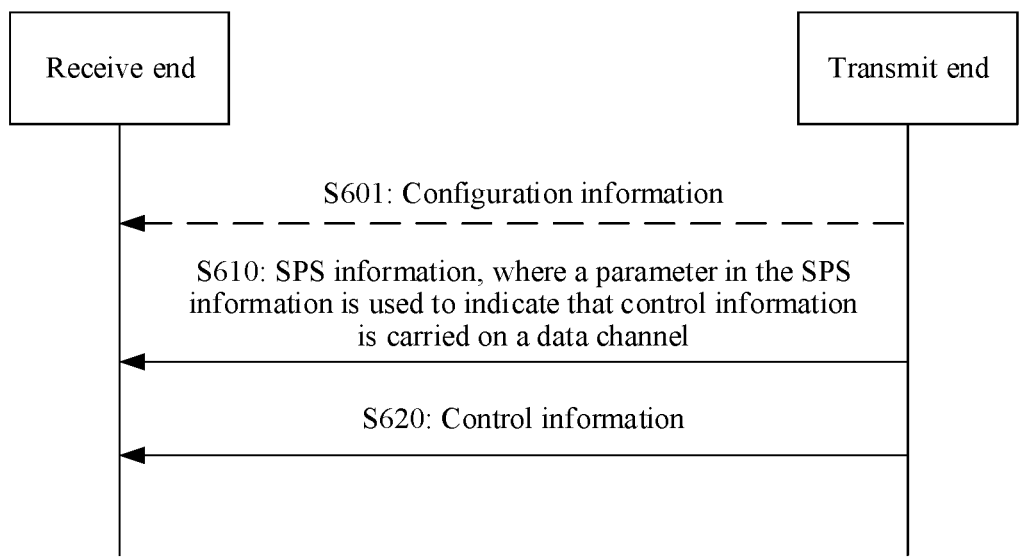
FIG. 8 is another schematic interaction diagram of a method for sending and receiving control information according to this application.
Figure 9:
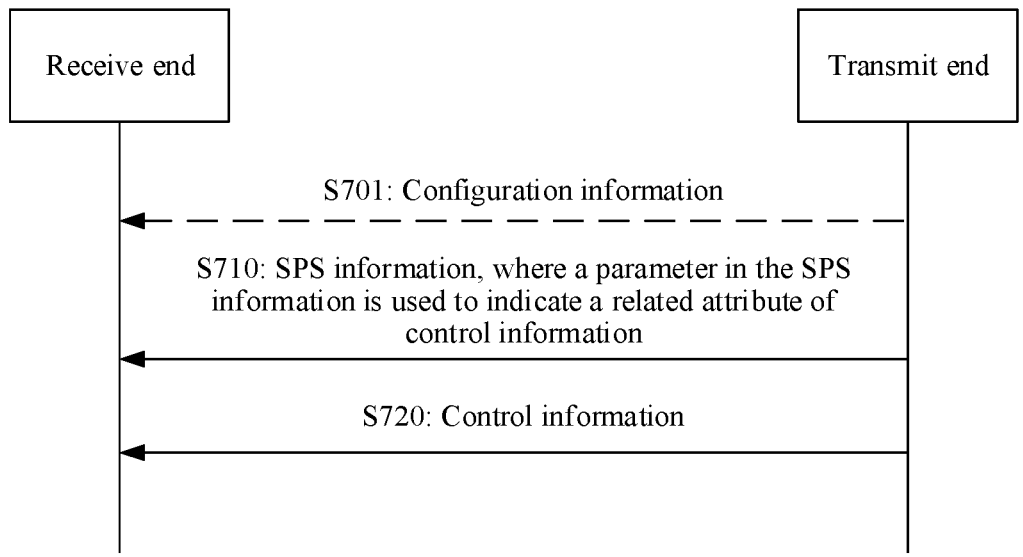
FIG. 9 is still another schematic interaction diagram of a method for sending and receiving control information according to this application.

The following describes the method 400 with reference to FIG. 6 and the embodiment of the method 200.

S401: A transmit end sends the start position of the time domain resource and/or the frequency domain resource occupied by the data channel, where the start position is used to indicate that the control information is carried on the data channel.

Correspondingly, the receive end receives the start position.

For example, the data channel may be a data channel used for communication between a terminal device and a network device, or may be a data channel used for sidelink SL communication between terminal devices. Different types of data channels may carry different types of control information, or may carry a same type of control information. This is not limited in this application. For specific descriptions of the data channel and the control information, refer to the foregoing related descriptions.

For example, the transmit end may notify the start position of the time domain resource and/or the frequency domain resource occupied by the data channel.

Same as the method 200, in this embodiment, a start position of a time domain resource and/or a frequency domain resource occupied by a data channel may be predefined or configured to indicate that the control information is carried on the data channel.

Optionally, before S410, in S401, the transmit end sends configuration information to the receive end, where the configuration information is used to configure the start position to indicate that the control information is carried on the data channel. Correspondingly, the receive end receives the configuration information.

For example, the configuration information may be used to configure a plurality of start positions. The plurality of start positions may be classified into two types. Start positions of each type include one or more start positions. Type 1 start positions may be configured to indicate that the control information is carried on the data channel, and type 2 start positions may be configured to indicate that the control information is not carried on the data channel. The start position in S410 belongs to the type 1 start positions. That is, the configuration information may be used to configure the start position to indicate whether the control information is carried on the data channel. In this way, in S410, the receive end obtains the start position, and determines, based on the start position, that the control information is carried on the data channel.

It is assumed that the configuration information may be used to configure three start positions, namely, a start position #1, a start position #2, and a start position #3. The type 1 start positions include the start position #1 and the start position #2, to indicate that the control information is carried on the data channel, and the type 2 start positions include the start position #3, to indicate that the control information is not carried on the data channel. The start position in S410 may be the start position #1 or the start position #2.

For example, in this embodiment of this application, a relative position may be used to indicate the start position. Further, a parameter related to the relative position may be used to indicate whether the control information is carried on the data channel.

A start position of a time domain resource is used as an example. The start position may be determined based on parameters K0 and S, where K0 represents an offset value between a slot in which a PDSCH is located and a slot in which DCI is located, and S represents an index value of a start orthogonal frequency division multiplexing (orthogonal frequency division multiplexing, OFDM) symbol in a slot. As an example rather than a limitation, parity of K0 and/or S may be predefined to indicate whether the control information is carried on the data channel. For example, if K0 is an odd number, it indicates that the control information is carried on the data channel; or if K0 is an even number, it indicates that the control information is not carried on the data channel. For another example, if S is an odd number, it indicates that the control information is carried on the data channel; or if S is an even number, it indicates that the control information is not carried on the data channel. For another example, if both K0 and S are odd numbers, it indicates that the control information is carried on the data channel; or if both K0 and S are even numbers, it indicates that the control information is not carried on the data channel.

A start position of a frequency domain resource is used as an example. In control information used to schedule a data channel, a bitmap (bitmap) may be used to indicate a resource unit (for example, a resource block group (resource block group, RBG)) occupied by the data channel. For example, if a bit value of a bit is "1", it indicates that a resource unit corresponding to the bit is allocated to the data channel; or if a bit value of a bit is "0", it indicates that a resource unit corresponding to the bit is not allocated to the data channel. As an example rather than a limitation, whether the control information is carried on the data channel may be indicated based on a feature that the first "1" appears in an odd bit or an even bit. For example, if the first "1" appears in the odd bit, it indicates that the control information is carried on the data channel; or if the first "1" appears in the even bit, it indicates that the control information is not carried on the data channel. For another example, if the first "1" appears in the even bit, it indicates that the control information is carried on the data channel; or if the first "1" appears in the odd bit, it indicates that the control information is not carried on the data channel.

It should be understood that a manner in which the transmit end configures, by using the configuration information, the start position to indicate whether the control information is carried on the data channel is merely an example for description, and shall not constitute a limitation on this application. For example, the type 1 start positions and the type 2 start positions may alternatively be predefined in a protocol or by a system. S410: The receive end obtains the start position, and may determine, based on the start position and based on a predefined type of a start position, that the start position belongs to the type 1 start positions. In this way, the receive end may determine that the control information is carried on the data channel.

S420: The transmit end sends the control information on the data channel. Correspondingly, the receive end receives the control information on the data channel.

Optionally, the transmit end may receive the control information on a first time-frequency resource on the data channel. A specific position of the first time-frequency resource on the data channel may be predefined, may be notified by the transmit end to the receive end, or may be obtained by the receive end by using other content. This is not limited in this application. For a manner in which the transmit end determines the first time-frequency resource, refer to the manner 1 and manner 2 in the method 200. Details are not described herein again.

Optionally, the start position may be further used to indicate a related attribute of the control information. The related attribute of the control information includes one or more of the following: a start position or an end position of the first time-frequency resource that carries the control information, a size of the control information, a function of the control information, or an encoding scheme of the control information. One or more items about the control information may be understood as content of one or more attributes of the control information.

Correspondingly, the receive end may receive the control information on the data channel based on the related attribute of the control information. For specific descriptions, refer to the foregoing related descriptions. Details are not described again.

As described above, to distinguish between content, of the control information, indicated by different start positions, the type 1 start positions may be divided into a plurality of subsets. Each subset includes one or more start positions. Start positions in two subsets may indicate a same attribute or different attributes of the control information. When the start positions in the two subsets indicate the same attribute of the control information, specific content of the same attribute is different.

For example, one or more start positions of a subset #1 indicate a size of the control information and a function of the control information, and one or more start positions of a subset #2 indicate a size of the control information and an encoding scheme. The size, of the control information, indicated by the start positions of the subset #1 may be the same as or different from the size, of the control information, indicated by the start positions of the subset #2.

For example, the start positions of the subset #1 and the start positions of the subset #2 both indicate a same attribute of the control information, that is, both indicate a size of the control information, a function of the control information, or an encoding scheme of the control information. However, specific content of the same attribute, of the control information, indicated by the start positions of the subset #1 and the start positions of the subset #2 is different. A size of the control information is used as an example. The size, of the control information, indicated by the start positions of the subset #1 is 4, and the size, of the control information, indicated by the start positions of the subset #2 is 5.

In this way, the start position of the time domain resource and/or the frequency domain resource occupied by the data channel is used to indicate the related attribute of the control information, so that the receive end can obtain, based on the start position, the related attribute of the control information before decoding content carried on the current data channel, to correctly receive the control information on the current data channel. In addition, because the start position is sent to the receive end for data receiving, signaling overheads can be effectively reduced.

Therefore, according to the method for sending and receiving control information provided in this application, the transmit end sends the control information on the data channel, so that the receive end does not need to monitor a control channel through blind detection within a period of time that is after the receive end receives the control information. In this way, power consumption of the receive end and detection complexity can be effectively reduced. In addition, the start position of the time domain resource and/or the frequency domain resource occupied by the data channel is sent to the receive end for data receiving. Therefore, when the start position is used to indicate whether the control information is carried on the data channel, before decoding the content carried on the current data channel, the receive end can determine, based on the start position, that the control information is carried on the current data channel, to correctly receive the control information, so that the signaling overheads can be effectively reduced. In addition, because the control information does not need to be carried on the control channel, this application is well applicable to a transmission scenario in which a data channel is configured through semi-persistent scheduling or higher layer signaling.

It should be noted that the method may be independently implemented, or may be used in combination with the method 200, so that the control information is received on the data channel. A specific combination manner is not limited in this embodiment of this application. For example, the start position of the time domain resource and/or the frequency domain resource occupied by the data channel and the attribute information of the DMRS may be used to jointly indicate whether the control information is carried on the data channel. For another example, one of the start position or the DMRS may be used to indicate whether the control information is carried on the data channel, and the other one of the start position or the DMRS may be used to indicate attribute information of the control information.

This application further provides another method 500 for sending and receiving control information. In the method, a start position of a time domain resource and/or a frequency domain resource occupied by a data channel may not be required to separately indicate whether control information is carried on the data channel, and the start position may be used to indicate a related attribute of the control information. A receive end may determine, depending on whether the start position indicates the related attribute of the control information, whether the control information is carried on the data channel, and receive the control information based on attribute information of the control information. The following describes the method 500 with reference to FIG. 7 and related descriptions of the method 400.

S510: A transmit end sends the start position of the time domain resource and/or the frequency domain resource occupied by the data channel, where the start position is used to indicate the related attribute of the control information. The related attribute of the control information includes one or more of the following: a start position or an end position of a first time-frequency resource that carries the control information, a size of the control information, a function of the control information, or an encoding scheme of the control information.

Correspondingly, the receive end receives the start position and determines the related attribute of the control information.

In this embodiment, that the start position is used to indicate the related attribute of the control information means that the control information is carried on the data channel. Therefore, the start position may not only be used to indicate the related attribute of the control information, but also implicitly indicate that the control information is carried on the data channel. By using the start position, the receive end may not only know that the control information is carried on the data channel, but also know the related attribute of the control information, to receive the control information on the data channel.

In this application, the start position may be predefined or configured to indicate the related attribute of the control information.

Optionally, before S510, in S501, the transmit end sends configuration information to the receive end, where the configuration information is used to configure the start position to indicate one or more of the following: the start position or the end position of the first time-frequency resource that carries the control information, the size of the control information, the function of the control information, or the encoding scheme of the control information. Correspondingly, the receive end receives the configuration information.

For example, the configuration information may be used to configure a plurality of start positions. The plurality of start positions may be classified into two types. Start positions of each type include one or more start positions. Type 1 start positions may be configured to indicate related attributes of the control information. The type 1 start positions may be divided into a plurality of subsets. Each subset includes one or more start positions. Start positions in two subsets may indicate a same attribute or different attributes of the control information. When the start positions in the two subsets indicate the same attribute of the control information, specific content of the same attribute is different. For specific descriptions, refer to related descriptions of the method 400. Details are not described herein again. The start position in S510 belongs to the type 1 start positions. Type 2 start positions may be configured to not indicate related attributes of the control information, or may be configured to indicate that the type 2 start positions are irrelevant to the control information. That is, the configuration information may be used to configure whether the start position is used to indicate the related attribute of the control information. In this way, in S510, the receive end obtains the start position, and may determine the related attribute of the control information based on the start position.

For a manner in which the start position indicates the related attribute of the control information, refer to related descriptions of the method 400. Details are not described herein again.

S520: The transmit end sends the control information on the data channel. Correspondingly, the receive end may receive the control information on the data channel based on the related attribute of the control information.

For specific descriptions of this step, refer to related descriptions of the method 400. Details are not described herein again.

Therefore, according to the method for sending and receiving control information provided in this application, the transmit end sends the control information on the data channel, so that the receive end does not need to monitor a control channel through blind detection within a period of time that is after the receive end receives the control information. In this way, power consumption of the receive end and detection complexity can be effectively reduced. In addition, the start position of the time domain resource and/or the frequency domain resource occupied by the data channel always needs to be sent to the receive end for data receiving. Therefore, when the start position is used to indicate the related attribute of the control information carried on the data channel, before decoding content carried on the current data channel, the receive end can determine, based on the start position, the related attribute of the control information carried on the current data channel, to correctly receive the control information, so that signaling overheads can be effectively reduced. In addition, because the control information does not need to be carried on the control channel, this application is well applicable to a transmission scenario in which a data channel is configured through semi-persistent scheduling or higher layer signaling.

It should be noted that the method may be independently implemented, or may be used in combination with the method 300, so that the control information is received on the data channel. A specific combination manner is not limited in this embodiment of this application. For example, the start position of the time domain resource and/or the frequency domain resource occupied by the data channel and the attribute information of the DMRS may be used to jointly indicate the related attribute of the control information.

This application further provides another method 600 for sending and receiving control information. The method is applicable to downlink semi-persistent transmission (semi-persistent transmission, SPS). One or more parameters in SPS information configured by a network device serving as a transmit end may be used to indicate whether control information is carried on a data channel used for semi-persistent transmission, and optionally, may be further used to indicate a related attribute of the control information. The following describes the method 600 with reference to FIG. 8 and related descriptions of the method 200.

S610: A transmit end sends the SPS information, where the parameters in the SPS information are used to indicate that the control information is carried on the data channel.

For example, the parameters in the SPS information include one or more of the following: an SPS period, a quantity of HARQ processes, a feedback resource used to transmit a HARQ feedback, or a modulation and coding scheme (modulation and coding scheme, MCS). The following describes each parameter in detail.

SPS Period

The SPS period indicates a validity period of semi-persistent scheduling, and may have a plurality of period lengths, for example, 10 period lengths. For example, SPS periods may be classified into two types. SPS periods of each type include one or more period lengths. Type 1 SPS periods are predefined or configured to indicate that the control information is carried on the data channel within the configured validity period, and type 2 SPS periods are predefined or configured to indicate that the control information is not carried on the data channel within the configured validity period. The SPS period in S610 belongs to the type 1 SPS periods. For example, the type 1 SPS periods include 10 milliseconds or 20 milliseconds, indicating that the control information is carried on the data channel within a validity period of 10 milliseconds or 20 milliseconds. The type 2 SPS periods include 32 milliseconds or 40 milliseconds, indicating that the control information is not carried on the data channel within a validity period of 32 milliseconds or 40 milliseconds.

Quantity of HARQ Processes

The quantity of HARQ processes may have a plurality of values, for example, values 1 to 8. For example, quantities of HARQ processes may be classified into two types. Quantities of HARQ processes of each type include one or more values. Type 1 quantities of HARQ processes are predefined or configured to indicate that the control information is carried on the data channel within the configured validity period, and type 2 quantities of HARQ processes are predefined or configured to indicate that the control information is not carried on the data channel within the configured validity period. The quantity of HARQ processes in S610 belongs to the type 1 quantities of HARQ processes. For example, the type 1 quantities of HARQ processes include values 1 to 4, and the type 2 quantities of HARQ processes include values 5 to 8.

Feedback Resource Used to Transmit a HARQ Feedback

Feedback resources may be represented by using a plurality of indexes, and one index indicates one feedback resource. For example, an integer ranging from 0 to 127 may be used to represent an index of a feedback resource. For example, the feedback resources may be classified into two types. Feedback resources of each type include one or more indexes. Type 1 feedback resources are predefined or configured to indicate that the control information is carried on the data channel within the configured validity period, and type 2 feedback resources are predefined or configured to indicate that the control information is not carried on the data channel within the configured validity period. The index of the feedback resource in S610 belongs to the type 1 feedback resources. For example, the type 1 feedback resources include indexes whose values are 0 to 62, and the type 2 feedback resources include indexes whose values are 63 to 127.

MCS

A plurality of MCSs are predefined in a protocol, and one MCS may be represented by using an MCS table. For example, the MCSs may be classified into two types. MCSs of each type include one or more MCSs. Type 1 MCSs are predefined or configured to indicate that the control information is carried on the data channel within the configured validity period, and type 2 indexes are predefined or configured to indicate that the control information is not carried on the data channel within the configured validity period. The MCS in S610 belongs to the type 1 MCSs.

As described above, the parameters in the SPS information may be predefined or configured to indicate that the control information is carried on the data channel.

Optionally, before S610, in S601, the transmit end sends configuration information to the receive end, where the configuration information is used to configure the parameters in the SPS information to indicate that the control information is carried on the data channel. Correspondingly, the receive end receives the configuration information.

For example, the configuration information may be used to configure one or more parameters in the SPS information.

For a specific parameter, content (for example, specific values) of the parameter may be classified into two types: type 1 and type 2. The type 1 is configured to indicate that the control information is carried on the data channel within the configured validity period, and the type 2 is configured to indicate that the control information is not carried on the data channel within the configured validity period. Content of the parameters in the SPS information in S610 belongs to the type 1. That is, the configuration information may be used to configure the parameters in the SPS information to indicate whether the control information is carried on the data channel. For type 1 and type 2 of each parameter, refer to the foregoing related descriptions. Details are not described again.

S620: The transmit end sends the control information on the data channel. Correspondingly, the receive end receives the control information on the data channel.

Optionally, the transmit end may receive the control information on a first time-frequency resource on the data channel. A specific position of the first time-frequency resource on the data channel may be predefined, may be notified by the transmit end to the receive end, or may be obtained by the receive end by using other content. This is not limited in this application. For a manner in which the transmit end determines the first time-frequency resource, refer to the manner 1 and manner 2 in the method 200. Details are not described herein again.

Optionally, the parameters in the SPS information may be further used to indicate the related attribute of the control information. The related attribute of the control information includes one or more of the following: a start position or an end position of the first time-frequency resource that carries the control information, a size of the control information, a function of the control information, or an encoding scheme of the control information. One or more items about the control information may be understood as content of one or more attributes of the control information.

Correspondingly, the receive end may receive the control information on the data channel based on the related attribute of the control information. For specific descriptions, refer to the foregoing related descriptions. Details are not described again.

A process in which each parameter in the SPS information indicates a related attribute of the control information is described in detail by using the SPS period as an example. It should be understood that a process in which another parameter indicates a related attribute of the control information is similar to the process in which an SPS period indicates a related attribute of the control information. Details are not described subsequently.

To distinguish between content, of the control information, indicated by the SPS periods, the type 1 SPS periods may be divided into a plurality of subsets. Each subset includes one or more period lengths. Period lengths in two subsets may indicate a same attribute or different attributes of the control information. When the period lengths in the two subsets indicate the same attribute of the control information, specific content of the same attribute is different.

For example, one or more period lengths of a subset #1 indicate a size of the control information and a function of the control information, and one or more period lengths of a subset #2 indicate a size of the control information and an encoding scheme. The size, of the control information, indicated by the period lengths of the subset #1 may be the same as or different from the size, of the control information, indicated by the period lengths of the subset #2.

For example, the period lengths of the subset #1 and the period lengths of the subset #2 both indicate a same attribute of the control information, that is, both indicate a size of the control information, a function of the control information, or an encoding scheme of the control information. However, specific content of the same attribute, of the control information, indicated by the period lengths of the subset #1 and the period lengths of the subset #2 is different. A size of the control information is used as an example. The size, of the control information, indicated by the period lengths of the subset #1 is 4, and the size, of the control information, indicated by the period lengths of the subset #2 is 5.

In this way, the parameters in the SPS information are used to indicate the related attribute of the control information, so that the receive end can obtain, by using the parameters in the SPS information, the related attribute of the control information before decoding content carried on the current data channel, to correctly receive the control information on the current data channel. In addition, because the parameters in the SPS information are sent to the receive end for data receiving, signaling overheads can be effectively reduced.

Therefore, according to the method for sending and receiving control information provided in this application, the transmit end sends the control information on the data channel, so that the receive end does not need to monitor a control channel through blind detection within a period of time that is after the receive end receives the control information. In this way, power consumption of the receive end and detection complexity can be effectively reduced. In addition, the parameters in the SPS information are sent to the receive end for data receiving. Therefore, when the parameters in the SPS information are used to indicate whether the control information is carried on the data channel, before decoding the content carried on the current data channel, the receive end can determine, by using the parameters in the SPS information, that the control information is carried on the current data channel, to correctly receive the control information, so that the signaling overheads can be effectively reduced.

This application further provides another method 700 for sending and receiving control information. Same as the method 600, the method is applicable to downlink SPS. One or more parameters in SPS information configured by a network device serving as a transmit end may be used to indicate a related attribute of control information carried on a data channel used for semi-persistent transmission. In addition, in the method, the parameters in the SPS information may not be required to separately indicate whether the control information is carried on the data channel, and the parameters in the SPS information may be used to indicate the related attribute of the control information. A receive end may determine, depending on whether the parameters in the SPS information indicate the related attribute of the control information, whether the control information is carried on the data channel, and receive the control information based on attribute information of the control information. The following describes the method 600 with reference to FIG. 9 and related descriptions of the method 600.

S710: The transmit end sends the SPS information, where the parameters in the SPS information are used to indicate the related attribute of the control information. The related attribute of the control information includes one or more of the following: a start position or an end position of a first time-frequency resource that carries the control information, a size of the control information, a function of the control information, or an encoding scheme of the control information.

In this embodiment, that the parameters in the SPS information are used to indicate the related attribute of the control information means that the control information is carried on the data channel. Therefore, the parameters in the SPS information may not only be used to indicate the related attribute of the control information, but also implicitly indicate that the control information is carried on the data channel. By using the parameters in the SPS information, the receive end may not only know that the control information is carried on the data channel, but also know the related attribute of the control information, to receive the control information on the data channel.

For example, the parameters in the SPS information include one or more of the following: an SPS period, a quantity of HARQ processes, a feedback resource used to transmit a HARQ feedback, or an MCS.

In this application, the parameters in the SPS information may be predefined or configured to indicate the related attribute of the control information.

Optionally, before S710, in S701, the transmit end sends configuration information to the receive end, where the configuration information is used to configure the parameters in the SPS information to indicate one or more of the following: the start position or the end position of the first time-frequency resource that carries the control information, the size of the control information, the function of the control information, or the encoding scheme of the control information. Correspondingly, the receive end receives the configuration information.

A process in which each parameter in the SPS information indicates a related attribute of the control information is described in detail by using the SPS period as an example. It should be understood that a process in which another parameter indicates a related attribute of the control information is similar to the process in which an SPS period indicates a related attribute of the control information. Details are not described subsequently.

For example, the SPS period configured by using the configuration information may include a plurality of period lengths. SPS periods may be classified into two types. SPS periods of each type include one or more period lengths. Type 1 SPS periods may be configured to indicate related attributes of the control information. The type 1 SPS periods may be divided into a plurality of subsets. Each subset includes one or more period lengths. Period lengths in two subsets may indicate a same attribute or different attributes of the control information. When the period lengths in the two subsets indicate the same attribute of the control information, specific content of the same attribute is different. For specific descriptions, refer to related descriptions of the method 600. Details are not described herein again. The SPS period in S710 belongs to the type 1 SPS periods. Type 2 SPS periods may be configured to not indicate related attributes of the control information, or may be configured to indicate that the type 2 SPS periods are irrelevant to the control information. That is, the configuration information may be used to configure the SPS period to indicate the related attribute of the control information. In this way, in S710, the receive end obtains the SPS period, and may determine the related attribute of the control information by using the SPS period.

For a manner in which the SPS period indicates the related attribute of the control information, refer to related descriptions of the method 600. Details are not described herein again.

S720: The transmit end sends the control information on the data channel. Correspondingly, the receive end may receive the control information on the data channel based on the related attribute of the control information.

For specific descriptions of this step, refer to related descriptions of the method 600. Details are not described herein again.

Therefore, according to the method for sending and receiving control information provided in this application, the transmit end sends the control information on the data channel, so that the receive end does not need to monitor a control channel through blind detection within a period of time that is after the receive end receives the control information. In this way, power consumption of the receive end and detection complexity can be effectively reduced. In addition, the parameters in the SPS information are sent to the receive end for data receiving. Therefore, when the parameters in the SPS information are used to indicate the related attribute of the control information carried on the data channel, before decoding content carried on the current data channel, the receive end can determine, by using the parameters in the SPS information, the related attribute of the control information carried on the current data channel, to correctly receive the control information, so that signaling overheads can be effectively reduced.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

Corresponding to the methods provided in the foregoing method embodiments, an embodiment of this application further provides a corresponding apparatus. The apparatus includes a corresponding module configured to perform the foregoing embodiments. The module may be software, hardware, or a combination of software and hardware.

Figure 10:
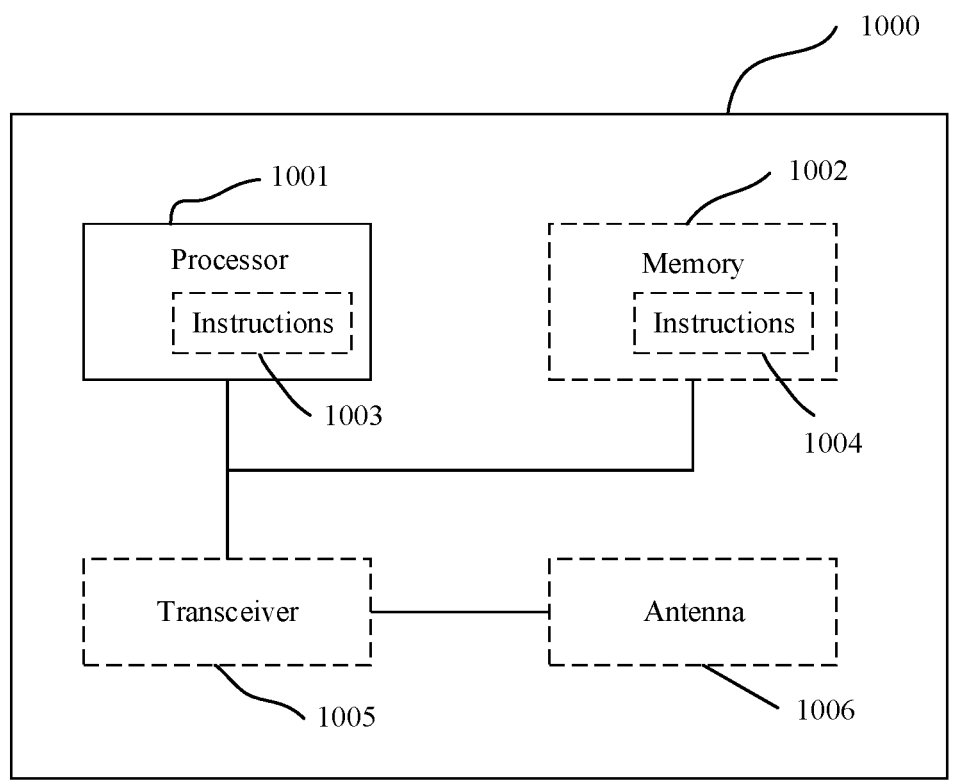
FIG. 10 is a schematic diagram of a structure of an apparatus according to this application.

FIG. 10 is a schematic diagram of a structure of an apparatus. The apparatus 1000 may be a network device; or may be a terminal device; or may be a chip, a chip system, a processor, or the like that supports a network device in implementing the foregoing method; or may be a chip, a chip system, a processor, or the like that supports a terminal device in implementing the foregoing method. The apparatus may be configured to implement the method described in the foregoing method embodiments. For details, refer to the descriptions in the foregoing method embodiments.

The apparatus 1000 may include one or more processors 1001. The processor 1001 may also be referred to as a processing unit, and can implement a specific control function. The processor 1001 may be a general-purpose processor, a dedicated processor, or the like. For example, the processor 1001 may be a baseband processor or a central processing unit. The baseband processor may be configured to process a communication protocol and communication data. The central processing unit may be configured to: control a communication apparatus (for example, a base station, a baseband chip, a terminal, a terminal chip, a DU, or a CU), execute a software program, and process data of the software program.

In an optional design, the processor 1001 may alternatively store instructions and/or data 1003, and the instructions and/or data 1003 may be run by the processor, to enable the apparatus 1000 to perform the method described in the foregoing method embodiments.

In another optional design, the processor 1001 may include a transceiver unit configured to implement receiving and sending functions. For example, the transceiver unit may be a transceiver circuit, an interface, or an interface circuit. A transceiver circuit, an interface, or an interface circuit configured to implement the sending function and a transceiver circuit, an interface, or an interface circuit configured to implement the receiving function may be separate, or may be integrated. The transceiver circuit, the interface, or the interface circuit may be configured to read and write code or data. Alternatively, the transceiver circuit, the interface, or the interface circuit may be configured to transmit or transfer a signal.

In still another possible design, the apparatus 1000 may include a circuit, and the circuit may implement the sending, receiving, or communication function in the foregoing method embodiments.

Optionally, the apparatus 1000 may include one or more memories 1002. The memory may store instructions 1004, and the instructions may be run on the processor, to enable the apparatus 1000 to perform the method described in the foregoing method embodiments. Optionally, the memory may further store data. Optionally, the processor may also store instructions and/or data. The processor and the memory may be separately disposed, or may be integrated together. For example, the correspondence described in the foregoing method embodiments may be stored in the memory or stored in the processor.

Optionally, the apparatus 1000 may further include a transceiver 1005 and/or an antenna 1006. The processor 1001 may be referred to as a processing unit, and control the apparatus 1000. The transceiver 1005 may be referred to as a transceiver unit, a transceiver, a transceiver circuit, a transceiver, or the like, and is configured to implement sending and receiving functions.

The apparatus 1000 in this embodiment of this application may be configured to perform the method described in FIG. 3, FIG. 5, FIG. 6, FIG. 7, FIG. 8, or FIG. 9 in the embodiments of this application, or may be configured to perform a method in which the methods described in the foregoing two or more figures are combined with each other.

In a possible design, an apparatus 1000 (for example, an integrated circuit, a wireless device, a circuit module, or a terminal device) may include a transceiver 1005. The apparatus 1000 is configured to perform procedures and steps corresponding to the receive end in the foregoing method 200, or may be configured to perform procedures and steps corresponding to the receive end in FIG. 3.

The transceiver 1005 is configured to obtain a demodulation reference signal DMRS, where attribute information of the DMRS is used to indicate that control information is carried on a data channel.

The transceiver 1005 is further configured to receive the control information on the data channel.

Optionally, the apparatus 1000 includes a processor 1001, and the processor 1001 is configured to process the DMRS.

Therefore, according to the apparatus for sending and receiving control information provided in this application, a transmit end sends the control information on the data channel, so that the apparatus does not need to monitor a control channel through blind detection within a period of time that is after the apparatus receives the control information. In this way, power consumption of the apparatus and detection complexity can be effectively reduced. In addition, the DMRS always needs to be sent to the apparatus for data demodulation. Therefore, when the attribute information of the DMRS is used to indicate whether the control information is carried on the data channel, before decoding content carried on the current data channel, the apparatus can determine, based on the DMRS, that the control information is carried on the current data channel, to correctly receive the control information, so that signaling overheads can be effectively reduced. In addition, because the control information does not need to be carried on the control channel, this application is well applicable to a transmission scenario in which a data channel is configured through semi-persistent scheduling or higher layer signaling.

Optionally, the attribute information of the DMRS is further used to indicate one or more of the following: a size of the control information, a function of the control information, or an encoding scheme of the control information.

Therefore, according to the apparatus for sending and receiving control information provided in this application, the attribute information of the DMRS is used to indicate a related attribute of the control information, so that the apparatus can obtain, based on the DMRS, the related attribute of the control information before decoding the content carried on the current data channel, to correctly receive the control information on the current data channel. In addition, because the DMRS always needs to be sent to the apparatus for data demodulation, the signaling overheads can be effectively reduced.

Optionally, the control information is carried on a first time-frequency resource, the first time-frequency resource is related to a first position and the size of the control information, and the first position is a start position of the first time-frequency resource or an end position of the first time-frequency resource.

Optionally, the first position corresponds to a second time-frequency resource, the second time-frequency resource is used to carry indication information, and the indication information is used to indicate the size of the control information.

Therefore, according to the apparatus for sending and receiving control information provided in this application, when the size of the control information has a large quantity of values, an implicit indication option may not be sufficient to completely cover all possible values of the size of the control information. Therefore, the size of the control information having a large quantity of values may be indicated by obtaining the size of the control information on the second time-frequency resource. In addition, because a receive end needs to determine, based on the first position, the first time-frequency resource that carries the control information, the first position is associated with the second time-frequency resource. In this way, in a possible implementation, the second time-frequency resource may be set at a position near the first time-frequency resource, so that the first time-frequency resource and the second time-frequency resource are mapped to a same resource block, to facilitate implementation.

Optionally, the attribute information of the DMRS includes one or more of the following: port information of the DMRS, sequence information of the DMRS, or a resource mapping manner of the DMRS.

Optionally, the sequence information of the DMRS includes one or more of the following: a cyclic shift of a sequence, a type of a sequence, or an initialization parameter of a sequence.

Optionally, the resource mapping manner of the DMRS includes one or more of the following: a comb frequency division manner, a time-domain code division manner, or a frequency-domain code division manner.

Optionally, the transceiver 1005 is further configured to receive configuration information, where the configuration information is used to configure the attribute information of the DMRS to indicate that the control information is carried on the data channel.

Optionally, the data channel is a data channel configured through semi-persistent scheduling or higher layer signaling.

In another possible design, an apparatus 1000 (for example, an integrated circuit, a wireless device, a circuit module, a network device, or a terminal device) may include a transceiver 1005. The apparatus 1000 is configured to perform procedures and steps corresponding to the transmit end in the foregoing method 200, or may be configured to perform procedures and steps corresponding to the transmit end in FIG. 3.

The transceiver 1005 is configured to send a demodulation reference signal DMRS, where attribute information of the DMRS is used to indicate that control information is carried on a data channel.

The transceiver 1005 is further configured to send the control information on the data channel.

Optionally, the apparatus 1000 includes a processor 1001, and the processor 1001 is configured to generate the DMRS.

Optionally, the attribute information of the DMRS is further used to indicate one or more of the following: a size of the control information, a function of the control information, or an encoding scheme of the control information.

Optionally, the control information is carried on a first time-frequency resource, the first time-frequency resource is related to a first position and the size of the control information, and the first position is a start position of the first time-frequency resource or an end position of the first time-frequency resource.

Optionally, the first position corresponds to a second time-frequency resource, the second time-frequency resource is used to carry indication information, and the indication information is used to indicate the size of the control information.

Optionally, the attribute information of the DMRS includes one or more of the following: port information of the DMRS, sequence information of the DMRS, or a resource mapping manner of the DMRS.

Optionally, the sequence information of the DMRS includes one or more of the following: a cyclic shift of a sequence, a type of a sequence, or an initialization parameter of a sequence.

Optionally, the resource mapping manner of the DMRS includes one or more of the following: a comb frequency division manner, a time-domain code division manner, or a frequency-domain code division manner.

Optionally, the transceiver 1005 is further configured to send configuration information, where the configuration information is used to configure the attribute information of the DMRS to indicate that the control information is carried on the data channel.

Optionally, the data channel is a data channel configured through semi-persistent scheduling or higher layer signaling.

In another possible design, an apparatus 1000 (for example, an integrated circuit, a wireless device, a circuit module, or a terminal device) may include a transceiver 1005. The apparatus 1000 is configured to perform procedures and steps corresponding to the receive end in the foregoing method 300, or may be configured to perform procedures and steps corresponding to the receive end in FIG. 5.

The transceiver 1005 is configured to obtain a demodulation reference signal DMRS, where attribute information of the DMRS is used to indicate one or more of the following: a size of the control information, a function of the control information, or an encoding scheme of the control information.

The transceiver 1005 is further configured to receive the control information on a data channel.

Optionally, the apparatus 1000 includes a processor 1001, and the processor 1001 is configured to process the DMRS.

Therefore, according to the apparatus for sending and receiving control information provided in this application, a transmit end sends the control information on the data channel, so that the apparatus does not need to monitor a control channel through blind detection within a period of time that is after the apparatus receives the control information. In this way, power consumption of the apparatus and detection complexity can be effectively reduced. In addition, the DMRS always needs to be sent to the apparatus for data demodulation. Therefore, when the attribute information of the DMRS is used to indicate a related attribute of the control information carried on the data channel, before decoding content carried on the current data channel, the apparatus can determine, based on the DMRS, the related attribute of the control information carried on the current data channel, to correctly receive the control information, so that signaling overheads can be effectively reduced. In addition, because the control information does not need to be carried on the control channel, this application is well applicable to a transmission scenario in which a data channel is configured through semi-persistent scheduling or higher layer signaling.

Optionally, the attribute information of the DMRS includes one or more of the following: port information of the DMRS, sequence information of the DMRS, or a resource mapping manner of the DMRS.

Optionally, the sequence information of the DMRS includes one or more of the following: a cyclic shift of a sequence, a type of a sequence, or an initialization parameter of a sequence.

Optionally, the resource mapping manner of the DMRS includes one or more of the following: a comb frequency division manner, a time-domain code division manner, or a frequency-domain code division manner.

Optionally, the transceiver 1005 is further configured to receive configuration information, where the configuration information is used to configure the attribute information of the DMRS to indicate one or more of the following: a size of the control information, a function of the control information, or an encoding scheme of the control information.

Optionally, the data channel is a data channel configured through semi-persistent scheduling or higher layer signaling.

In another possible design, an apparatus 1000 (for example, an integrated circuit, a wireless device, a circuit module, a network device, or a terminal device) may include a transceiver 1005. The apparatus 1000 is configured to perform procedures and steps corresponding to the transmit end in the foregoing method 300, or may be configured to perform procedures and steps corresponding to the transmit end in FIG. 5.

The transceiver 1005 is configured to send a demodulation reference signal DMRS, where attribute information of the DMRS is used to indicate one or more of the following: a size of the control information, a function of the control information, or an encoding scheme of the control information.

The transceiver 1005 is further configured to send the control information on a data channel.

Optionally, the apparatus 1000 includes a processor 1001, and the processor 1001 is configured to generate the DMRS.

Optionally, the attribute information of the DMRS includes one or more of the following: port information of the DMRS, sequence information of the DMRS, or a resource mapping manner of the DMRS.

Optionally, the sequence information of the DMRS includes one or more of the following: a cyclic shift of a sequence, a type of a sequence, or an initialization parameter of a sequence.

Optionally, the resource mapping manner of the DMRS includes one or more of the following: a comb frequency division manner, a time-domain code division manner, or a frequency-domain code division manner.

Optionally, the transceiver 1005 is further configured to send configuration information, where the configuration information is used to configure the attribute information of the DMRS to indicate one or more of the following: the size of the control information, the function of the control information, or the encoding scheme of the control information.

Optionally, the data channel is a data channel configured through semi-persistent scheduling or higher layer signaling.

The processor and the transceiver that are described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may alternatively be manufactured by using various IC process technologies, for example, a complementary metal oxide semiconductor (CMOS), an N-type metal oxide semiconductor (nMetal-oxide-semiconductor, NMOS), a P-type metal oxide semiconductor (positive channel metal oxide semiconductor, PMOS), a bipolar junction transistor (BJT), a bipolar CMOS (BiCMOS), silicon germanium (SiGe), and gallium arsenide (GaAs).

The apparatus described in the foregoing embodiments may be a network device or a terminal device. However, a range of the apparatus described in this application is not limited thereto, and a structure of the apparatus may not be limited to FIG. 10. The apparatus may be an independent device, or may be a part of a larger device. For example, the apparatus may be:

(1) an independent integrated circuit IC, a chip, or a chip system or subsystem;
(2) a set of one or more ICs, where optionally, the IC set may further include a storage component configured to store data and/or instructions;
(3) an ASIC, for example, a modem (MSM);
(4) a module that can be embedded in another device;
(5) a receiver, a terminal, an intelligent terminal, a cellular phone, a wireless device, a handheld device, a mobile unit, a vehicle-mounted device, a network device, a cloud device, an artificial intelligence device, or the like; or
(6) others, or the like.

Figure 11:
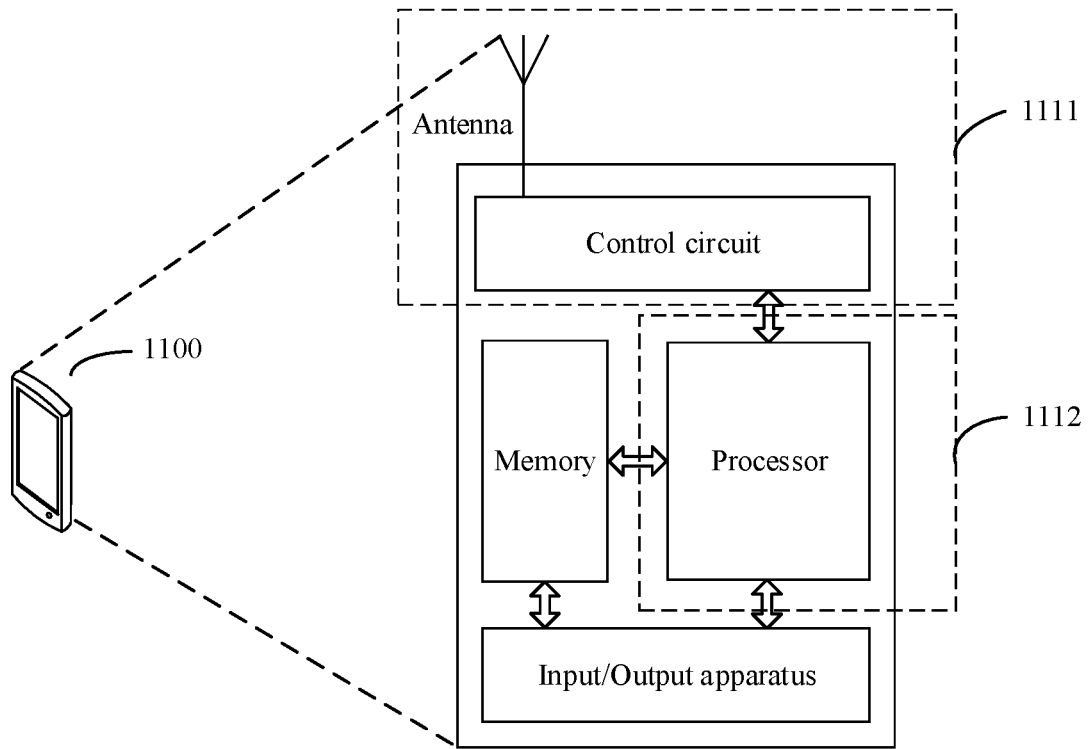
FIG. 11 is a schematic diagram of a structure of a terminal device according to this application.

FIG. 11 is a schematic diagram of a structure of a terminal device. The terminal device is applicable to the scenario shown in FIG. 1 or FIG. 2. For ease of description, FIG. 11 shows only main components of the terminal device. As shown in FIG. 11, the terminal device 1100 includes a processor, a memory, a control circuit, an antenna, and an input/output apparatus. The processor is mainly configured to: process a communication protocol and communication data, control an entire terminal, execute a software program, and process data of the software program. The memory is mainly configured to store the software program and the data. A radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to: receive data entered by a user and output data to the user.

After the terminal device is powered on, the processor may read the software program in a storage unit, parse and execute instructions of the software program, and process the data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and sends the radio frequency signal in a form of an electromagnetic wave by using the antenna. When data is sent to the terminal device, the radio frequency circuit receives a radio frequency signal by using the antenna, further converts the radio frequency signal into a baseband signal, and outputs the baseband signal to the processor. The processor converts the baseband signal into data, and processes the data.

For ease of description, FIG. 11 shows only one memory and one processor. In an actual terminal device, there may be a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor is mainly configured to process the communication protocol and the communication data. The central processing unit is mainly configured to: control the entire terminal device, execute the software program, and process the data of the software program. The processor in FIG. 11 is integrated with functions of the baseband processor and the central processing unit. A person skilled in the art may understand that the baseband processor and the central processing unit may alternatively be independent processors, and are interconnected by using a technology such as a bus. A person skilled in the art may understand that the terminal device may include a plurality of baseband processors to adapt to different network standards, the terminal device may include a plurality of central processing units to enhance a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

In an example, the antenna and the control circuit that have sending and receiving functions may be considered as a transceiver unit 1111 of the terminal device 1100, and the processor having a processing function may be considered as a processing unit 1112 of the terminal device 1100. As shown in FIG. 11, the terminal device 1100 includes the transceiver unit 1111 and the processing unit 1112. The transceiver unit may also be referred to as a transceiver, a transceiver, a transceiver apparatus, or the like. Optionally, a component that is in the transceiver unit 1111 and that is configured to implement a receiving function may be considered as a receiving unit, and a component that is in the transceiver unit 1111 and that is configured to implement a sending function may be considered as a sending unit. In other words, the transceiver unit 1111 includes the receiving unit and the sending unit. For example, the receiving unit may also be referred to as a receiver, a receiver, or a receiver circuit, and the sending unit may be referred to as a transmitter, a transmitter, or a transmitter circuit. Optionally, the receiving unit and the sending unit may be one integrated unit, or may be a plurality of independent units. The receiving unit and the sending unit may be in one geographical location, or may be distributed in a plurality of geographical locations.

Figure 12:
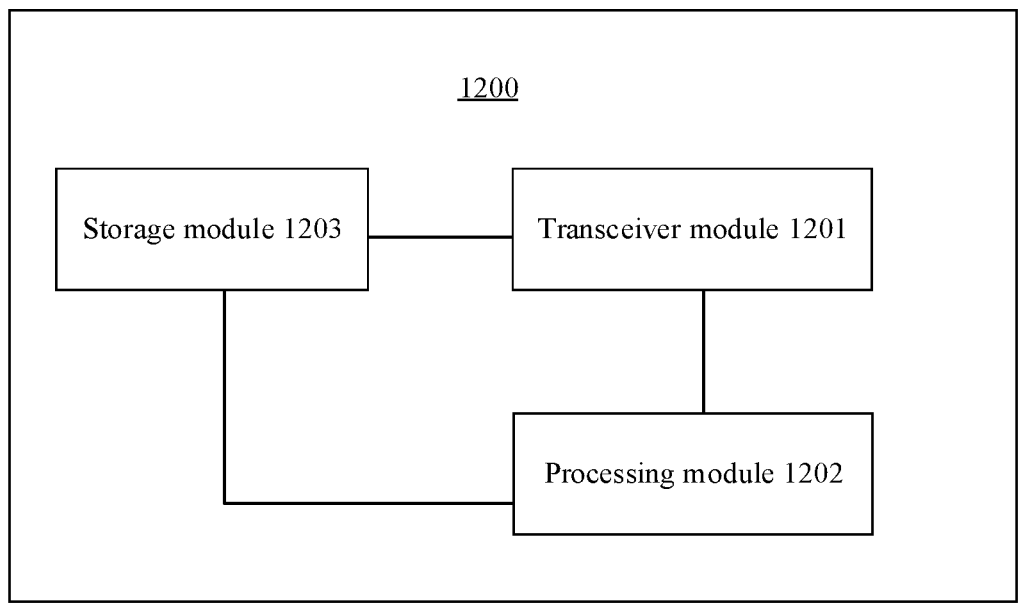
FIG. 12 is a schematic diagram of a communication device according to this application.

As shown in FIG. 12, another embodiment of this application provides an apparatus 1200. The apparatus may be a terminal, or may be a component (for example, an integrated circuit or a chip) of the terminal. Alternatively, the apparatus may be a network device, or may be a component (for example, an integrated circuit or a chip) of the network device. Alternatively, the apparatus may be another communication module configured to implement the methods in the method embodiments of this application. The apparatus 1200 may include a processing module 1202 (a processing unit). Optionally, the apparatus 1200 may further include a transceiver module 1201 (a transceiver unit) and a storage module 1203 (a storage unit).

In a possible design, one or more modules in FIG. 12 may be implemented by one or more processors, or may be implemented by one or more processors and memories, or may be implemented by one or more processors and transceivers, or may be implemented by one or more processors, memories, and transceivers. This is not limited in this embodiment of this application. The processor, the memory, and the transceiver may be disposed separately, or may be integrated.

The apparatus has a function of implementing the terminal device described in the embodiments of this application. For example, the apparatus includes a corresponding module, unit, or means used for the terminal device to perform the steps related to the terminal device that are described in the embodiments of this application. The function, the unit, or the means may be implemented by software or hardware, or may be implemented by hardware executing corresponding software, or may be implemented by a combination of software and hardware. For details, refer to the corresponding descriptions in the foregoing corresponding method embodiments.

Alternatively, the apparatus has a function of implementing the network device described in the embodiments of this application. For example, the apparatus includes a corresponding module, unit, or means used for the network device to perform the steps related to the network device that are described in the embodiments of this application. The function, the unit, or the means may be implemented by software or hardware, or may be implemented by hardware executing corresponding software, or may be implemented by a combination of software and hardware. For details, refer to the corresponding descriptions in the foregoing corresponding method embodiments.

Each module in the apparatus 1200 in this embodiment of this application may be configured to perform the method described in FIG. 3, FIG. 5, FIG. 6, FIG. 7, FIG. 8, or FIG. 9 in the embodiments of this application, or may be configured to perform a method in which the methods described in the foregoing two or more figures are combined with each other.

In a possible implementation, an apparatus 1200 may include a transceiver module 1201. The apparatus 1200 is configured to perform procedures and steps corresponding to the receive end in the foregoing method 200, or may be configured to perform procedures and steps corresponding to the receive end in FIG. 3.

The transceiver module 1201 is configured to obtain a demodulation reference signal DMRS, where attribute information of the DMRS is used to indicate that control information is carried on a data channel.

The transceiver module 1201 is further configured to receive the control information on the data channel.

Optionally, the apparatus 1200 includes a processing module 1202, and the processing module 1202 is configured to process the DMRS.

Therefore, according to the apparatus for sending and receiving control information provided in this application, a transmit end sends the control information on the data channel, so that the apparatus does not need to monitor a control channel through blind detection within a period of time that is after the apparatus receives the control information. In this way, power consumption of the apparatus and detection complexity can be effectively reduced. In addition, the DMRS always needs to be sent to the apparatus for data demodulation. Therefore, when the attribute information of the DMRS is used to indicate whether the control information is carried on the data channel, before decoding content carried on the current data channel, the apparatus can determine, based on the DMRS, that the control information is carried on the current data channel, to correctly receive the control information, so that signaling overheads can be effectively reduced. In addition, because the control information does not need to be carried on the control channel, this application is well applicable to a transmission scenario in which a data channel is configured through semi-persistent scheduling or higher layer signaling.

Optionally, the attribute information of the DMRS is further used to indicate one or more of the following: a size of the control information, a function of the control information, or an encoding scheme of the control information.

Therefore, according to the apparatus for sending and receiving control information provided in this application, the attribute information of the DMRS is used to indicate a related attribute of the control information, so that the apparatus can obtain, based on the DMRS, the related attribute of the control information before decoding the content carried on the current data channel, to correctly receive the control information on the current data channel. In addition, because the DMRS always needs to be sent to the apparatus for data demodulation, the signaling overheads can be effectively reduced.

Optionally, the control information is carried on a first time-frequency resource, the first time-frequency resource is related to a first position and the size of the control information, and the first position is a start position of the first time-frequency resource or an end position of the first time-frequency resource.

Optionally, the first position corresponds to a second time-frequency resource, the second time-frequency resource is used to carry indication information, and the indication information is used to indicate the size of the control information.

Therefore, according to the apparatus for sending and receiving control information provided in this application, when the size of the control information has a large quantity of values, an implicit indication option may not be sufficient to completely cover all possible values of the size of the control information. Therefore, the size of the control information having a large quantity of values may be indicated by obtaining the size of the control information on the second time-frequency resource. In addition, because a receive end needs to determine, based on the first position, the first time-frequency resource that carries the control information, the first position is associated with the second time-frequency resource. In this way, in a possible implementation, the second time-frequency resource may be set at a position near the first time-frequency resource, so that the first time-frequency resource and the second time-frequency resource are mapped to a same resource block, to facilitate implementation.

Optionally, the attribute information of the DMRS includes one or more of the following: port information of the DMRS, sequence information of the DMRS, or a resource mapping manner of the DMRS.

Optionally, the sequence information of the DMRS includes one or more of the following: a cyclic shift of a sequence, a type of a sequence, or an initialization parameter of a sequence.

Optionally, the resource mapping manner of the DMRS includes one or more of the following: a comb frequency division manner, a time-domain code division manner, or a frequency-domain code division manner.

Optionally, the transceiver module 1201 is further configured to receive configuration information, where the configuration information is used to configure the attribute information of the DMRS to indicate that the control information is carried on the data channel.

Optionally, the data channel is a data channel configured through semi-persistent scheduling or higher layer signaling.

In another possible implementation, an apparatus 1200 may include a transceiver module 1201. The apparatus 1200 is configured to perform procedures and steps corresponding to the transmit end in the foregoing method 200, or may be configured to perform procedures and steps corresponding to the transmit end in FIG. 3.

The transceiver module 1201 is configured to send a demodulation reference signal DMRS, where attribute information of the DMRS is used to indicate that control information is carried on a data channel.

The transceiver module 1201 is further configured to send the control information on the data channel.

Optionally, the apparatus 1200 includes a processing module 1202, and the processing module 1202 is configured to generate the DMRS.

Optionally, the attribute information of the DMRS is further used to indicate one or more of the following: a size of the control information, a function of the control information, or an encoding scheme of the control information.

Optionally, the control information is carried on a first time-frequency resource, the first time-frequency resource is related to a first position and the size of the control information, and the first position is a start position of the first time-frequency resource or an end position of the first time-frequency resource.

Optionally, the first position corresponds to a second time-frequency resource, the second time-frequency resource is used to carry indication information, and the indication information is used to indicate the size of the control information.

Optionally, the attribute information of the DMRS includes one or more of the following: port information of the DMRS, sequence information of the DMRS, or a resource mapping manner of the DMRS.

Optionally, the sequence information of the DMRS includes one or more of the following: a cyclic shift of a sequence, a type of a sequence, or an initialization parameter of a sequence.

Optionally, the resource mapping manner of the DMRS includes one or more of the following: a comb frequency division manner, a time-domain code division manner, or a frequency-domain code division manner.

Optionally, the transceiver module 1201 is further configured to send configuration information, where the configuration information is used to configure the attribute information of the DMRS to indicate that the control information is carried on the data channel.

Optionally, the data channel is a data channel configured through semi-persistent scheduling or higher layer signaling.

In another possible implementation, an apparatus 1200 may include a transceiver module 1201. The apparatus 1200 is configured to perform procedures and steps corresponding to the receive end in the foregoing method 300, or may be configured to perform procedures and steps corresponding to the receive end in FIG. 5.

The transceiver module 1201 is configured to obtain a demodulation reference signal DMRS, where attribute information of the DMRS is used to indicate one or more of the following: a size of the control information, a function of the control information, or an encoding scheme of the control information.

The transceiver module 1201 is further configured to receive the control information on a data channel.

Optionally, the apparatus 1200 includes a processing module 1202, and the processing module 1202 is configured to process the DMRS.

Therefore, according to the apparatus for sending and receiving control information provided in this application, a transmit end sends the control information on the data channel, so that the apparatus does not need to monitor a control channel through blind detection within a period of time that is after the apparatus receives the control information. In this way, power consumption of the apparatus and detection complexity can be effectively reduced. In addition, the DMRS always needs to be sent to the apparatus for data demodulation. Therefore, when the attribute information of the DMRS is used to indicate a related attribute of the control information carried on the data channel, before decoding content carried on the current data channel, the apparatus can determine, based on the DMRS, the related attribute of the control information carried on the current data channel, to correctly receive the control information, so that signaling overheads can be effectively reduced. In addition, because the control information does not need to be carried on the control channel, this application is well applicable to a transmission scenario in which a data channel is configured through semi-persistent scheduling or higher layer signaling.

Optionally, the attribute information of the DMRS includes one or more of the following: port information of the DMRS, sequence information of the DMRS, or a resource mapping manner of the DMRS.

Optionally, the sequence information of the DMRS includes one or more of the following: a cyclic shift of a sequence, a type of a sequence, or an initialization parameter of a sequence.

Optionally, the resource mapping manner of the DMRS includes one or more of the following: a comb frequency division manner, a time-domain code division manner, or a frequency-domain code division manner.

Optionally, the transceiver module 1201 is further configured to receive configuration information, where the configuration information is used to configure the attribute information of the DMRS to indicate one or more of the following: the size of the control information, the function of the control information, or the encoding scheme of the control information.

Optionally, the data channel is a data channel configured through semi-persistent scheduling or higher layer signaling.

In another possible implementation, an apparatus 1200 may include a transceiver module 1201. The apparatus 1200 is configured to perform procedures and steps corresponding to the transmit end in the foregoing method 300, or may be configured to perform procedures and steps corresponding to the transmit end in FIG. 5.

The transceiver module 1201 is configured to send a demodulation reference signal DMRS, where attribute information of the DMRS is used to indicate one or more of the following: a size of the control information, a function of the control information, or an encoding scheme of the control information.

The transceiver module 1201 is further configured to send the control information on a data channel.

Optionally, the apparatus 1000 includes a processing module 1202, and the processing module 1202 is configured to generate the DMRS.

Optionally, the attribute information of the DMRS includes one or more of the following: port information of the DMRS, sequence information of the DMRS, or a resource mapping manner of the DMRS.

Optionally, the sequence information of the DMRS includes one or more of the following: a cyclic shift of a sequence, a type of a sequence, or an initialization parameter of a sequence.

Optionally, the resource mapping manner of the DMRS includes one or more of the following: a comb frequency division manner, a time-domain code division manner, or a frequency-domain code division manner.

Optionally, the transceiver module 1201 is further configured to send configuration information, where the configuration information is used to configure the attribute information of the DMRS to indicate one or more of the following: the size of the control information, the function of the control information, or the encoding scheme of the control information.

Optionally, the data channel is a data channel configured through semi-persistent scheduling or higher layer signaling.

It may be understood that, in some scenarios, some optional features in the embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, an apparatus provided in the embodiments of this application may also correspondingly implement these features or functions. Details are not described herein.

A person skilled in the art may further understand that various illustrative logical blocks and steps that are listed in the embodiments of this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of the embodiments of this application.

It should be understood that the processor in the embodiments of this application may be an integrated circuit chip, and has a signal processing capability. In an implementation process, the steps in the foregoing method embodiments may be completed by using a hardware integrated logic circuit in the processor or instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component.

The technologies described in this application may be implemented in various manners. For example, these technologies may be implemented by using hardware, software, or a combination of hardware and software. For hardware implementation, a processing unit configured to perform these technologies at a communication apparatus (for example, a base station, a terminal, a network entity, or a chip) may be implemented in one or more general-purpose processors, a DSP, a digital signal processing device, an ASIC, a programmable logic device, an FPGA, or another programmable logic apparatus, a discrete gate or transistor logic device, a discrete hardware component, or any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

It may be understood that, in the embodiments of this application, the memory may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through examples but not limitative descriptions, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the system and method described in this specification includes but is not limited to these memories and any memory of another proper type.

This application further provides a computer-readable medium. The computer-readable medium stores a computer program. When the computer program is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When software is used for implementation, all or some of the embodiments may be implemented in a form of a computer program product. The computer program product includes one or more computer instructions. When the computer instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that "an embodiment" mentioned in the entire specification means that particular features, structures, or characteristics related to the embodiment are included in at least one embodiment of this application. Therefore, the embodiments in the entire specification are not necessarily same embodiments. In addition, these particular features, structures, or characteristics may be combined in one or more embodiments in any proper manner. It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

It should be further understood that, in this application, "when" and "if" mean that UE or a base station performs corresponding processing in an objective situation, and are not intended to limit time, and the UE or the base station is not necessarily required to have a determining action during implementation, and do not mean any other limitation.

A person of ordinary skill in the art may understand that various reference numerals such as "first" and "second" in this application are merely used for differentiation for ease of description, and are not used to limit a scope of the embodiments of this application, or represent a sequence.

In this application, unless otherwise specified, an element represented in a singular form is intended to represent "one or more", but is not intended to represent "one and only one". In this application, unless otherwise specified, "at least one" is intended to represent "one or more", and "a plurality of" is intended to represent "two or more".

In addition, the terms "system" and "network" are usually used interchangeably in this specification. The term "and/or" in this specification describes only an association relationship for describing associated objects and represents that three relationships may exist. For example, A and/or B may represent the following three cases: only A exists, both A and B exist, and only B exists. A may be singular or plural, and B may be singular or plural.

The character "/" usually indicates an "or" relationship between the associated objects.

The term "at least one of" in this specification indicates all or any combination of listed items. For example, "at least one of A, B, and C" may indicate the following six cases: Only A exists, only B exists, only C exists, both A and B exist, both B and C exist, and A, B and C all exist. A may be singular or plural, B may be singular or plural, and C may be singular or plural.

It should be understood that, in the embodiments of this application, "B corresponding to A" indicates that B is associated with A, and B may be determined based on A. However, it should further be understood that determining B based on A does not mean that B is determined based only on A, and B may alternatively be determined based on A and/or other information.

The correspondences shown in the tables in this application may be configured, or may be predefined. Values of the information in the tables are merely examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "store", "pre-store", "pre-negotiate", "pre-configure", "solidify", or "pre-burn".

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in another manner. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. Parts displayed as units may or may not be physical units, to be specific, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, or a network device) to perform all or some of the steps in the method described in the embodiments of this application. The foregoing storage medium includes: any medium that can store program code, such as a USB flash drive, a removable hard disk, a read-only memory (ROM), a random access memory (RAM), a magnetic disk, or an optical disc.

For same or similar parts in the embodiments of this application, refer to each other. In the embodiments of this application and the implementations/implementation methods in the embodiments, unless otherwise specified or a logical conflict occurs, terms and/or descriptions are consistent and may be mutually referenced between different embodiments and between the implementations/implementation methods in the embodiments. Technical features in the different embodiments and the implementations/implementation methods in the embodiments may be combined to form a new embodiment, implementation, or implementation method according to an internal logical relationship thereof. The foregoing descriptions are implementations of this application, but are not intended to limit the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   obtaining a demodulation reference signal (DMRS), wherein attribute information of the DMRS is used to indicate that control information is carried on a data channel, wherein the attribute information of the DMRS comprises one or more of the following: port information of the DMRS, sequence information of the DMRS, or a resource mapping manner of the DMRS; and
   receiving the control information on the data channel;
   wherein the control information is carried on a first time-frequency resource, the first time-frequency resource is related to a first position and the size of the control information, and the first position is a start position of the first time-frequency resource or an end position of the first time-frequency resource; and
   wherein the first position corresponds to a second time-frequency resource, the second time-frequency resource is used to carry indication information, and the indication information is used to indicate the size of the control information.

2. The method according to claim 1, wherein the attribute information of the DMRS is further used to indicate one or more of the following: a size of the control information, a function of the control information, or an encoding scheme of the control information.

3. The method according to claim 1, wherein the resource mapping manner of the DMRS includes one or more of a comb frequency division manner, a time-domain code division manner, or a frequency-domain code division manner.

4. The method according to claim 1, wherein the sequence information of the DMRS comprises one or more of the following: a cyclic shift of a sequence, a type of a sequence, or an initialization parameter of a sequence.

5. The method according to claim 1, wherein the resource mapping manner of the DMRS comprises one or more of the following: a comb frequency division manner, a time-domain code division manner, or a frequency-domain code division manner.

6. The method according to claim 1, wherein the method further comprises:
   receiving configuration information, wherein the configuration information is used to configure the attribute information of the DMRS to indicate that the control information is carried on the data channel.

7. The method according to claim 1, wherein the data channel is a data channel configured through semi-persistent scheduling or higher layer signaling.

8. A communication method, comprising:
   sending a demodulation reference signal (DMRS), wherein attribute information of the DMRS is used to indicate that control information is carried on a data channel, wherein the attribute information of the DMRS comprises one or more of the following: port information of the DMRS, sequence information of the DMRS, or a resource mapping manner of the DMRS; and
   sending the control information on the data channel;
   wherein the control information is carried on a first time-frequency resource, the first time-frequency resource is related to a first position and the size of the control information, and the first position is a start position of the first time-frequency resource or an end position of the first time-frequency resource; and
   wherein the first position corresponds to a second time-frequency resource, the second time-frequency resource is used to carry indication information, and the indication information is used to indicate the size of the control information.

9. The method according to claim 8, wherein the attribute information of the DMRS is further used to indicate one or more of the following: a size of the control information, a function of the control information, or an encoding scheme of the control information.

10. The method according to claim 8, wherein the resource mapping manner of the DMRS includes one or more of a comb frequency division manner, a time-domain code division manner, or a frequency-domain code division manner.

11. The method according to claim 8, wherein the sequence information of the DMRS comprises one or more of the following: a cyclic shift of a sequence, a type of a sequence, or an initialization parameter of a sequence.

12. The method according to claim 8, wherein the resource mapping manner of the DMRS comprises one or more of the following: a comb frequency division manner, a time-domain code division manner, or a frequency-domain code division manner.

13. The method according to claim 8, wherein the method further comprises:
  sending configuration information, wherein the configuration information is used to configure the attribute information of the DMRS to indicate that the control information is carried on the data channel.

14. The method according to claim 8, wherein the data channel is a data channel configured through semi-persistent scheduling or higher layer signaling.

15. An apparatus, comprising a processor, wherein the processor is coupled to a memory; the memory is configured to store a program or instructions; and when the program or the instructions is/are executed by the processor, the apparatus is enabled to perform the method, comprising:
  obtaining a demodulation reference signal (DMRS), wherein attribute information of the DMRS is used to indicate that control information is carried on a data channel, wherein the attribute information of the DMRS comprises one or more of the following: port information of the DMRS, sequence information of the DMRS, or a resource mapping manner of the DMRS; and
  receiving the control information on the data channel;
  wherein the control information is carried on a first time-frequency resource, the first time-frequency resource is related to a first position and the size of the control information, and the first position is a start position of the first time-frequency resource or an end position of the first time-frequency resource; and
  wherein the first position corresponds to a second time-frequency resource, the second time-frequency resource is used to carry indication information, and the indication information is used to indicate the size of the control information.

\* \* \* \* \*